(12) United States Patent
Nagashima et al.

(10) Patent No.: US 8,883,275 B2
(45) Date of Patent: Nov. 11, 2014

(54) INKJET RECORDING MEDIUM AND INK SET, AND INKJET RECORDING METHOD

(75) Inventors: Hidefumi Nagashima, Kanagawa (JP); Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/494,222

(22) Filed: Jun. 12, 2012

(65) Prior Publication Data

US 2013/0002776 A1    Jan. 3, 2013

(30) Foreign Application Priority Data

Jun. 28, 2011  (JP) ................................. 2011-142598
Nov. 2, 2011   (JP) ................................. 2011-240933

(51) Int. Cl.
   *B41M 5/00*     (2006.01)
   *C09D 11/322*   (2014.01)
   *C09D 11/326*   (2014.01)
   *C09D 11/328*   (2014.01)
   *B41M 5/52*     (2006.01)
   *C09D 11/38*    (2014.01)
   *C09D 11/40*    (2014.01)
   *C09D 11/30*    (2014.01)

(52) U.S. Cl.
   CPC .............. *B41M 5/52* (2013.01); *C09D 11/322* (2013.01); *C09D 11/326* (2013.01); *C09D 11/328* (2013.01); *B41M 5/5227* (2013.01); *C09D 11/38* (2013.01); *C09D 11/40* (2013.01); *B41M 5/5218* (2013.01); *C09D 11/30* (2013.01)
   USPC ..... 428/32.1; 347/105; 106/31.43; 106/31.58

(58) Field of Classification Search
   CPC .... B41M 5/52; B41M 5/5227; B41M 5/5218; C09D 11/38; C09D 11/30; C09D 11/328; C09D 11/326
   USPC ............. 428/32.1; 347/105; 106/31.43, 31.58
   See application file for complete search history.

(56) References Cited

U.S. PATENT DOCUMENTS

| 7,919,544 | B2 | 4/2011 | Matsuyama et al. | |
| 8,109,622 | B2 | 2/2012 | Goto et al. | |
| 8,110,257 | B2 | 2/2012 | Nagashima et al. | |
| 2004/0046848 | A1* | 3/2004 | Payne et al. | 347/101 |
| 2007/0197685 | A1 | 8/2007 | Aruga et al. | |
| 2008/0233363 | A1 | 9/2008 | Goto | |
| 2009/0176070 | A1 | 7/2009 | Goto et al. | |
| 2009/0258196 | A1 | 10/2009 | Nagashima et al. | |
| 2010/0196601 | A1 | 8/2010 | Goto et al. | |
| 2010/0196602 | A1 | 8/2010 | Koyano et al. | |
| 2010/0295891 | A1 | 11/2010 | Goto et al. | |
| 2010/0302326 | A1* | 12/2010 | Morohoshi et al. | 347/86 |
| 2011/0057981 | A1 | 3/2011 | Aruga et al. | |
| 2011/0164086 | A1 | 7/2011 | Ggoto et al. | |
| 2011/0292114 | A1* | 12/2011 | Sao et al. | 347/20 |
| 2011/0292141 | A1* | 12/2011 | Sao et al. | 347/100 |
| 2012/0098883 | A1 | 4/2012 | Matsuyama et al. | |

FOREIGN PATENT DOCUMENTS

| CN | 101772554 | 7/2010 |
| CN | 101909898 | 12/2010 |
| JP | 2001-96902 | 4/2001 |
| JP | 2008-101192 | 5/2008 |
| JP | 2010-168433 | 8/2010 |
| JP | 2010-168433 A * | 8/2010 |

OTHER PUBLICATIONS

Claims, Abstract, and Drawings in U.S. Appl. No. 13/358,044, filed Jan. 25, 2012.
Chinese official action dated Nov. 29, 2013 in corresponding Chinese patent application No. 2012 10 21 9618.8.
Chinese official action dated May 22, 2014 in corresponding. Chinese patent application No. 2012 10 21 9618.8.

* cited by examiner

*Primary Examiner* — Betelhem Shewareged
(74) *Attorney, Agent, or Firm* — Cooper & Dunham LLP

(57) ABSTRACT

A inkjet recording medium and ink set including ink containing water, a hydrosoluble organic solvent comprising an amide compound represented by the following Chemical Structure 1, a surface active agent; and a coloring agent, and a recording medium containing a substrate; and a coated layer on at least one side of the substrate, wherein the transfer amount of pure water to the recording medium having the coated layer is 2 ml/m² to 35 ml/m² during a contact time of 100 ms and 3 ml/m² to 40 ml/m² during a contact time of 400 ms when measured by a liquid dynamic absorption tester at 23° C. and 50% RH:

Chemical Structure 1

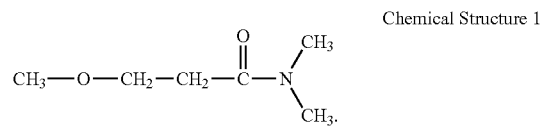

19 Claims, 5 Drawing Sheets

FIG. 1
FIG. 2
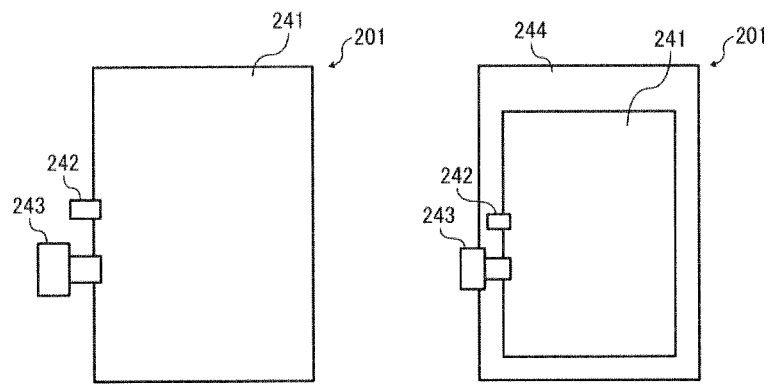
FIG. 3
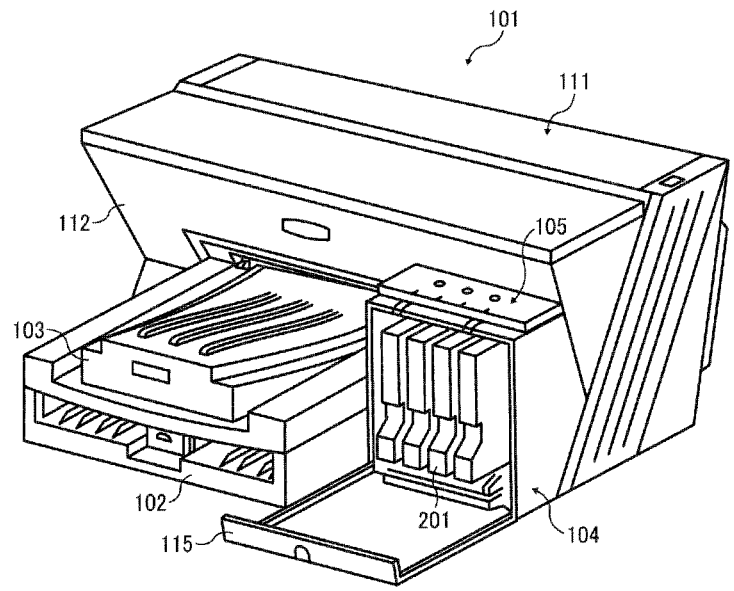

INKJET RECORDING MEDIUM AND INK SET, AND INKJET RECORDING METHOD

CROSS-REFERENCE TO RELATED APPLICATION

This patent application is based on and claims priority pursuant to 35 U.S.C. §119 to Japanese Patent Application Nos. 2011-142598 and 2011-240933, filed on Jun. 28, 2011 and Nov. 2, 2011, respectively, the entire disclosures of which are hereby incorporated by reference herein.

BACKGROUND OF THE INVENTION

1. Field of the Invention

The present invention relates to an inkjet recording medium and ink set, and a method of inkjet recording.

2. Description the Background

Inkjet recording is known as an excellent recording method capable of accommodating a comparatively wide selection of recording media. Accordingly, research and development of new types of recording apparatuses, recording methods, recording materials, etc. continue to be widely conducted.

In particular, pigment ink using a pigment as a coloring agent has been proposed for ink for inkjet recording. Pigment ink is superior to ink using a dye as a coloring agent when it comes to printing less-blurred images on plain paper because the pigment ink has excellent image density, water resistance, and weathering properties.

However, for recording media having coated layers and in particular media with poor ink absorption, images produced with pigment ink have inferior color and gloss.

In addition, it takes time to dry the ink, thereby causing problems when fixing images, etc.

To solve these problems, Japanese Patent Application Publication No. 2008-101192 (JP-2008-101192-A) describes ink for recording with which vivid images having quality close to those for commercial printing and published printed matter are formed on coated paper for printing which has poor liquid absorption ability without having trouble with drying speed.

However, the produced inkjet images printed on such coated paper have trouble with regard to the fixing property, curling, etc.

JP-2001-096902-A describes a set of aqueous ink for inkjet recording and an inkjet recording medium formed of a film substrate on which quality images are formed with the aqueous ink.

However, usable media are limited to film having high air permeability, i.e., high ink absorption, and moreover require processing to give the film a solvent-absorbing layer on one side and an ink-receiving layer on the opposite side.

Therefore, it is difficult to obtain recorded materials having a high image density on the recording media described above and free from the problems described above such as low fixing property and cockling.

SUMMARY OF THE INVENTION

In view of the foregoing, the present invention provides an inkjet recording medium and ink set, which includes ink that contains water; a hydrosoluble organic solvent containing an amide compound represented by the following Chemical Structure 1; a surface active agent; and a coloring agent; and the recording medium including a substrate; and a coated layer on at least one side of the substrate, wherein a transfer amount of pure water to the recording medium having the coated layer is 2 ml/m² to 35 ml/m² during a contact time of 100 ms and 3 ml/m² to 40 ml/m² during a contact time of 400 ms as measured by a liquid dynamic absorption tester at 23° C. and 50% RH.

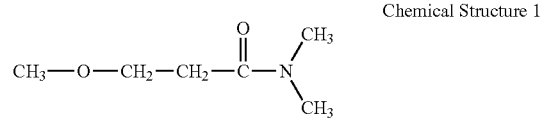

Chemical Structure 1

As another aspect of the present invention, a method of inkjet recording including discharging ink for inkjet recording onto a recording medium having a coated layer on at least one side thereof, wherein a transfer amount of pure water to the recording medium is 2 ml/m² to 35 ml/m² during a contact time of 100 ms and 3 ml/m² to 40 ml/m² during a contact time of 400 ms when measured by a liquid dynamic absorption tester at 23° C. and 50% RH and wherein the ink for inkjet recording comprises water, a hydrosoluble organic solvent comprising an amide compound represented by the following Chemical Structure 1, a surface active agent, and a coloring agent.

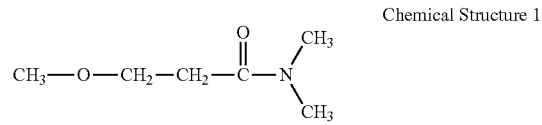

Chemical Structure 1

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 1 is a schematic diagram illustrating an ink cartridge

FIG. 2 is a schematic diagram illustrating a variation example of the ink cartridge illustrated in FIG. 1;

FIG. 3 is a perspective view illustrating an inkjet recording device in which the cover of the ink cartridge installation unit;

DETAILED DESCRIPTION OF THE PRESENT DISCLOSURE

Figure 4:
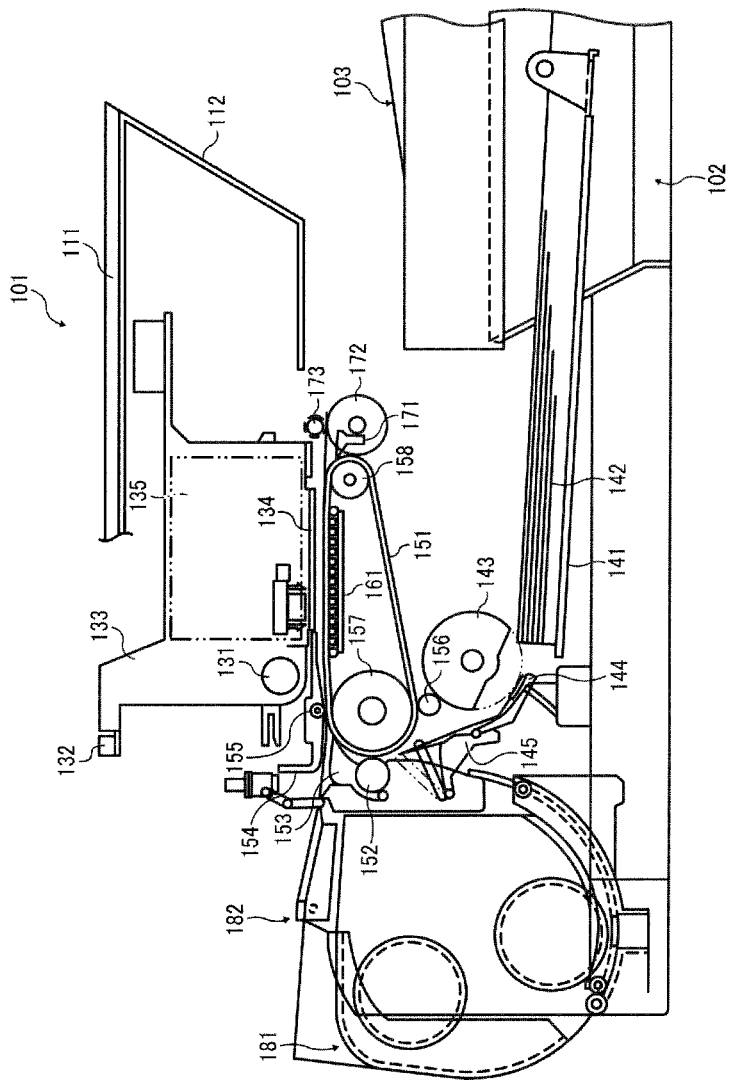
FIG. 4 is a cross section illustrating the entire configuration of the ink jet recording device of FIG. 3.

The ink for ink jet recording for use in the present disclosure contains at least water, a hydrosoluble organic solvent, a surface active agent, and a coloring agent. Other optional materials can be also contained.

Hydrosoluble Organic Solvent (Wetting Agent)

The ink for inkjet recording for use in the present disclosure contains at least an amide compound represented by the following Chemical Structure 1 as the hydrosoluble organic solvent. Other optional hydrosoluble organic solvents mentioned later can be admixed for use.

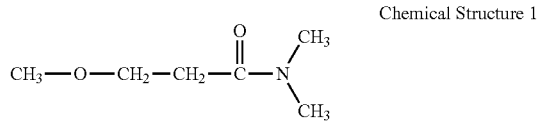

Chemical Structure 1

The amide compound represented by the Chemical Structure 1 has a high boiling point (i.e., 216° C.), a high equilibrium moisture content of 39.2% in an environment of 23° C. and a relative humidity of 80%, and an extremely low liquid viscosity of 1.48 mPa·S at 25° C. Furthermore, since the amide compound is extremely easily dissolved in the hydrosoluble organic solvent or water, the viscosity of the ink for inkjet recording decreases, which is extremely preferable as the ink for inkjet recording.

The ink for inkjet recording that contains the amide compound represented by the Chemical Structure 1 has good preservability and discharging stability and is friendly to the maintenance unit of the ink discharging device.

The content of the amide compound represented by the Chemical Structure 1 in the ink for inkjet recording is preferably from 1% by weight to 50% by weight and more preferably from 2% by weight to 40% % by weight. When the content is too small, the viscosity of the ink does not easily decrease, resulting in deterioration of the discharging stability and fixation of waste ink in the maintenance unit. In addition, when the content is too large, drying of the ink on recording media (typically, paper) tends to be inferior and the text quality on plain paper may deteriorate.

In addition, the hydrosoluble organic solvent mixed with the amide compound represented by the Chemical Structure 1 contains at least one kind of polyols having an equilibrium moisture content of 30% by weight or higher in an environment of 23° C. and a relative humidity of 80%. Furthermore, for example, as described above, it is preferable to contain a wetting agent A having a high equilibrium moisture content and a high boiling point (the equilibrium moisture content in an environment of 23° C. and a relative humidity of 80% is 30% by weight or more and preferably 40% by weight or more and the boiling point is 250° C. or higher) and a wetting agent B having a high equilibrium moisture content and a relatively low boiling point (the equilibrium moisture content in an environment of 23° C. and relative humidity of 80% is 30% by weight and the boiling point is from 140° C. to 250° C.).

In the polyol, specific examples of the wetting agent A having a boiling point of 250° C. or higher at normal pressure include, but are not limited to, 1,2,3-butane triol (boiling point: 175° C./33 hPa, 38% by weight), 1,2,4-butane triol (boiling point: 190° C. to 191° C./24 hPa, 41% by weight), glycerine (boiling point: 290° C., 49% by weight), diglycerine (boiling point: 270° C./20 hPa, 38% by weight), triethylene glycol (boiling point: 285° C., 39% by weight), and tetraethylene glycol (boiling point: 324° C. to 330° C., 37% by weight). A specific example of the wetting agent B having a boiling point of 140° C. to 250° C. is 1,3-butane diol (boiling point: 203° C. to 204° C., 35% by weight).

Both the wetting agent A and the wetting agent B have a high moisture absorbency such that the equilibrium moisture content is 30% by weight or more in an environment of 23° C. and a relative humidity of 80%. However, the wetting agent B has a relatively higher evaporativity than the wetting agent A. Among these, a group of glycerine and 1,3-butane diol is preferable.

When the wetting agent A and the wetting agent B are used in combination, although it is difficult to specifically limit the weight ratio of the wetting agent B to the wetting agent A because it is significantly dependent on the content of other wetting agents such as a wetting agent C and the content and the kind of additives such as a penetrating agent, for example, it is preferably from 10/90 to 90/10.

In the present disclosure, the equilibrium moisture content of the hydrosoluble organic solvent is obtained by the saturated moisture amount measured by preserving a petri dish on which one gram of each hydrosoluble organic solvent is placed in a desiccator, in which the temperature and the relative humidity are maintained at 22° C. to 24° C. and 77% to 83%, respectively, using a saturated solution of potassium chloride and sodium chloride. Saturated moisture amount= (moisture amount absorbed in the organic solvent/amount of organic solvent+moisture amount absorbed therein)×100

Discharging stability and prevention of the fixation of waste ink in the maintenance unit in an ink discharging device are excellent when the polyol mentioned above occupies 50% by weight or more in the entire hydrosoluble organic solvent.

The ink for inkjet recording for use in the present disclosure may contain the wetting agent C (typically, equilibrium moisture content: less than 30% by weight in an environment of 23° C. and a relative humidity of 80%) instead of part of or in addition to the wetting agent A and the wetting agent B.

Specific examples of the wetting agent C includes, but are note limited to, polyols, polyol alkyl ethers, polyol aryl ethers, nitrogen-containing heterocyclic compounds, amides, amines, sulfur-containing compounds, propylene carbonates, ethylene carbonates, and other wetting agents.

Specific examples of the polyols include, but are not limited to, dipropylene glycol (boiling point: 232° C.), 1,5-pentane diol (boiling point: 242° C.), 3-methyl-1,3-butane diol (boiling point: 203° C.), propylene glycol (boiling point: 187° C.), 2-methyl-2,4-pentane diol (boiling point: 197° C.), ethylene glycol (boiling point: 196° C. to 198° C.), tripropylene glycol (boiling point: 267° C.), hexylene glycol (boiling point: 197° C.), polyethylene glycol (viscostic liquid to solid), polypropylene glycol (boiling point: 187° C.), 1,6-hexane diol (boiling point: 253° C. to 260° C.), 1,2,6-hexane triol (boiling point: 178° C.), trimethylol ethane (solid; melting point: 199° C. to 201° C.), and trimethylol propane (solid; melting point: 61° C.).

Specific examples of the polyol alkyl ethers include, but are not limited to, ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point: 231° C.), ethylene glycol mono-2-ethylhexyl ether (boiling point: 229° C.), and propylene glycol monoethyl ether (boiling point: 132° C.).

Specific examples of the polyol aryl ethers include, but are not limited to, ethylene glycol monophenyl ether (boiling point: 237° C.) and ethylene glycol monobenzyl ether.

Specific examples of nitrogen-containing heterocyclic compounds include, but are not limited to, 2-pyrolidone (boiling point: 250° C., melting point: 25.5° C., 47% by weight to 48% by weight), N-methyl-2-pyrolidone (boiling point: 202° C.), 1,3-dimethylimidazoline (boiling point: 226° C.), ε-caprolactam (boiling point: 270° C.), and γ-butylolactone (boiling point: 204° C. to 205° C.).

Specific examples of the amides include, but are not limited to, formamide (boiling point: 210° C.), N-methyl formamide (boiling point: 199° C. to 201° C.), N,N-dimethylformamide (boiling point: 153° C.), and N,N-diethylformamide (boiling point: 176° C. to 177° C.).

Specific examples of the amines include, but are not limited to, monoethanol amine (boiling point: 170° C.), diethanol amine (boiling point: 268° C.), triethanol amine (boiling point: 360° C.), N,N-dimethyl monoethanol amine (boiling point: 139° C.), N-methyl diethanol amine (boiling point: 243° C.), N-methylethanol amine (boiling point: 159° C.), N-phenyl ethanol amine (boiling point: 282° C. to 287° C.), and 3-aminopropyl diethyl amine (boiling point: 169° C.).

Specific examples of the sulfur-containing compounds include, but are not limited to, dimethyl sulphoxide (boiling point: 139° C.), sulfolane (boiling point: 285° C.), and thiodiglycol (boiling point: 282° C.).

Sugar groups are also preferable as the wetting agents.

Specific examples of the sugar groups include, but are not limited to, monosaccharides, disaccharides, oligosaccharides (including trisaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and contain materials that are present widely in nature, for example, α-cyclodextrine and cellulose.

In addition, specific examples of derivatives of these sugar groups include, but are not limited to, reducing sugars (for example, sugar alcohols (represented by $HOCH_2(CHOH)_n CH_2OH$, where n represents an integer of from 2 to 5), oxidized sugars (e.g., aldonic acid and uronic acid), amino acid, and thio acid.

Among these, sugar alcohols are preferable and specific examples thereof include, but are not limited to, maltitol and sorbit.

The weight ratio of the pigment to the wetting agent mentioned above has an impact on the discharging stability of ink discharged from an inkjet head and also prevention of fixation of waste ink in the maintenance unit in an ink discharging device.

If the blending amount of the wetting agent is too small while the amount of the solid pigment portion is large, water evaporation around ink meniscus of nozzles tends to be accelerated, thereby causing bad discharging performance.

The hydrosoluble organic solvent that contains the amide compound represented by the Chemical Structure 1, the wetting agent A, the wetting agent B, and the wetting agent C is preferably contained in the ink for inkjet recording in an amount of from 20% by weight to 60% by weight and more preferably from 20% by weight to 50% by weight.

When the content is too small, the discharging stability and fixation of waste ink in the maintenance unit tend to deteriorate. When the content is too large, the viscosity of the ink for inkjet recording tends to rise too much to discharge the ink from the ink discharging device. In addition, the drying properties of the ink on the recording media (e.g., paper) tend to be inferior.

To improve the quality of images printed on plain paper, it is preferable to contain a wetting agent C1 having a boiling point lower than 240° C. and an equilibrium moisture content less than 30% by weight (the wetting agent C1 is an hydrosoluble organic solvent with an equilibrium moisture content less than 30% by weight in an environment of 23° C. and a relative humidity of 80% and a boiling point lower than 240° C. among the wetting agent C) in a suitable ratio.

The content of the hydrosoluble organic solvent is preferably 50% by weight or less based on the entire of the wetting agent in terms of discharging stability and prevention of the fixation of waste ink in the maintenance unit in an ink discharging device.

Coloring Agent

As the coloring agent, considering the weathering properties, pigments are mainly used. Optionally, dyes can be also contained within an amount in which the weathering properties are not degraded.

There is no specific limit to the selection of the pigments. Pigments for black color and pigments for color can be used. These can be used alone or in combination.

Specific examples of the inorganic pigments include, but are not limited to, titanium oxide, iron oxide, calcium oxide, barium sulfate, aluminum hydroxide, barium yellow, cadmium red, chrome yellow, and carbon black manufactured by known methods such as contact methods, furnace methods, and thermal methods.

Specific examples of the organic pigments include, but are not limited to, azo pigments (azo lakes, insoluble azo pigments, condensed azo pigments, chelate az pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black.

Among these pigments, pigments having good affinity with water are preferable in particular.

More preferred specific examples of the pigments for black color include, but are not limited to, carbon black (C.I. Pigment Black 7) such as furnace black, lamp black, acetylene black, and channel black, metals such as copper and iron (C.I. Pigment Black 11), metal compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow titanium oxide), 53, 55, 74, 81, 83, 95, 97, 98, 100, 101, 104, 108, 109, 110, 117, 120, 128, 138, 150, 151, 153, and 183, C.I. Pigment Orange 5, 13, 17, 36, 43, and 51, C.I. Pigment Red 1, 2, 3, 5, 17, 22, 23, 31, 38, 48:2, 48:2 {Permanent Red 2B (Ca)}, 48:3, 48:4, 49:1, 52:2, 53:1, 57:1 (Brilliant Carmine 6B), 60:1. 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, and 219, C.I. Pigment Violet (Rhodamine Lake), 3, 5:1, 16, 19, 23, and 38, C.I. Pigment Blue 1, 2, 15, 15:1, 15:2, 15:3, (phthalocyanine blue), 16, 17:1, 56, 60, 63, and C.I. Pigment Green 1, 4, 7, 8, 10, 17, 18, and 36.

The following first to third forms are preferable in the case in which the coloring agent is a pigment.

1) In the first form, the coloring agent has a pigment that has at least one kind of hydrophilic group on the surface and is hydrodispersible in the absence of a dispersing agent (hereinafter referred to as self-dispersible pigment).

2) In the second form, the coloring agent is a pigment dispersion that contains a pigment, a pigment dispersant, and a polymer dispersion stabilizer. The polymer dispersion stabilizer is at least one of a copolymer of α-olefin-maleic anhydride represented by the following Chemical Structure 2, a styrene-(meth)acrylic copolymer, a hydrosoluble polyurethane resin, and a hydrosoluble polyester resin.

Chemical Structure 2

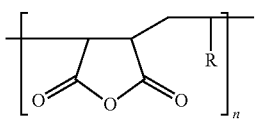

In the Chemical Structure 2, R represents an alkyl group having 6 to 30 carbon atoms, preferably 12 to 22 carbon atoms, and more preferably 18 to 22 carbon atoms and n represents an integer.

In the present disclosure, a mixture of the compounds represented by the Chemical Structure 2 having different values for R can be used as the copolymer of α-olefin-maleic anhydrides.

3) In the third form, the coloring agent contains a polymer emulsion (water dispersion material of polymer particulates containing a coloring material, e.g., pigment) in which the polymer particulates contains the coloring material having no or slight solubility in water.

The self dispersible pigment of the first form is surface-reformed in order that at least one hydrophilic group is bonded with the surface of the pigment directly or via another atom group. To conduct this surface reforming, a particular functional group (functional group such as sulfone group or carboxyl group) is chemically bonded on the surface of the pigment or the surface is wet-oxidized using at least one of hypohalous acid or a salt thereof.

Among these, a form is preferable in which a carboxyl group is bonded on the surface of the pigment and the pigment is dispersed in water.

Since the pigment is surface-reformed and the carboxyl group is bonded thereto, printing quality is improved and water resistance of the recording media after printing is improved in addition to improvement of the dispersion stability.

In addition, since the ink that contains the first form self dispersible pigment has an excellent re-dispersibility after drying, clogging does not occur even when the ink moisture around the inkjet head nozzles evaporates after the printing device is suspended for a long time. Therefore, quality images can be produced again by a simple cleaning operation.

The volume average particle diameter (D50) of the self dispersible pigment is preferably from 0.01 μm to 0.16 μm in the ink.

For example, self-dispersible carbon black is preferably ionic and an anionic or cationic-charged self-dispersible carbon black is preferable.

Specific examples of the anionic hydrophilic groups includes, but are not limited to, —COOM, —SO$_3$M, —PO$_3$HM, —PO$_3$M$_2$, —SO$_2$NH$_2$, —SO$_2$NHCOR (M represents a hydrogen atom, an alkali metal, ammonium, or an organic ammonium). R represents an alkyl group having 1 to 12 carbon atoms, a substituted or non-substituted phenyl group, or a substituted or non-substituted naphtyl group. Among these, it is preferable to use pigments in which —COOM or —SO$_3$M are bonded on the surface of the pigments.

Specific examples of the alkali metal of M in the hydrophilic group include, but are not limited to, lithium, sodium, and potassium. Specific examples of the organic ammonium include, but are not limited to, mono, di, or tri-methyl ammonium, mono, di, or tri-ethyl ammonium, and mono, di, or tri-methanol ammonium.

To obtain the anionic-charged color pigment, —COONa is introduced to the surface of the color pigment. For example, there are oxidizing methods using sodium hypochlorite, methods by sulfonating, and methods of using reaction of diazonium salt.

As the cationic hydrophilic group, quaternary ammonium groups are preferable. Among these, the quaternary ammonium groups represented by the following Chemical Structures 3 are more preferable. In the present disclosure, a coloring material in which any of these groups is bonded at the surface of carbon black is suitable.

Chemical Structure 3

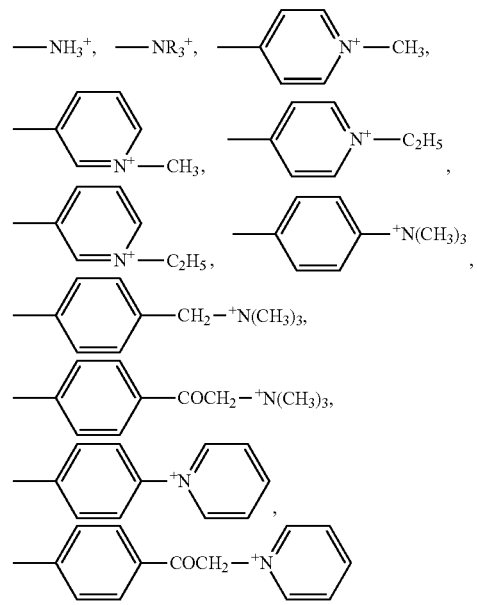

There is no specific limit to the method of manufacturing the cationic charged self dispersible carbon black to which the hydrophilic group is bonded. For example, to bond N-ethyl pyridine group represented by the following Chemical Structure 4, carbon black is treated with 3-amino-N ethyl pyridium bromide.

Chemical Structure 4

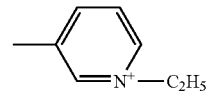

The hydrophilic group can be bonded with the surface of carbon black via another atom group. Specific examples of such atom groups include, but are not limited to, an alkyl group having 1 to 12 carbon atoms, a substituted or non-substituted phenyl group, or a substituted or non-substituted naphtyl group.

Specific examples of the cases in which the hydrophilic group is bonded with the surface of carbon black via another atom group include, but are not limited to —C$_2$H$_4$COOM (M represents an alkali metal or quaternary ammonium), -PhSO$_3$M (Ph represents a phenyl group. M represents alkali metal or quaternary ammonium), and —C$_5$H$_{10}$NH$_3^+$.

In the second form, the coloring agent is a pigment dispersion that contains pigments including an inorganic pigment, an organic pigment, and a complex pigment, a pigment dispersant, and a polymer dispersion stabilizer. The polymer dispersion stabilizer is at least one of a copolymer of α-olefin-maleic anhydride represented by the following Chemical Structure 2, a styrene-(meth)acrylic copolymer, a hydrosoluble polyurethane resin, and a hydrosoluble polyester resin.

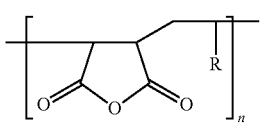

Chemical Structure 2

In the Chemical Structure 2, R represents an alkyl group having 6 to 30 carbon atoms, preferably 12 to 22 carbon atoms, and more preferably 18 to 22 carbon atoms and n represents an integer.

The polymer dispersion stabilizer is a material suitable to stably maintain the dispersion state of the pigment dispersion uniformly minutely-dispersed in water by the pigment dispersant.

The copolymer of α-olefin-maleic anhydride represented by the Chemical Structure 2, the styrene-(meth)acrylic copolymer, the hydrosoluble polyurethane resin, and the hydrosoluble polyester resin are solid at room temperature and barely soluble in iced water. However, when the copolymer and the resin are dissolved in an alkali (aqueous) solution equivalent (preferably 1.0 to 1.5 times) to the acid value of the copolymer and the resin, the solution demonstrates the effect of a dispersion stabilizer.

The copolymer and the resin are easily dissolved in an alkali (aqueous) solution by heating while stirring.

However, when the olefin chain is long in the copolymer of α-olefin-maleic anhydride, it is not easy to dissolve the copolymer in the alkali (aqueous) solution and insoluble matters may remain in some cases. In such a case, the solution can be still suitably used as the polymer dispersion stabilizer when the insoluble matter is removed with a filter, etc.

Specific examples of the base in the alkali (aqueous) solutions include, but are not limited to, hydroxides of alkali metals such as sodium hydroxide, potassium hydroxide, lithium hydroxide; basic materials such as ammonia, triethyl amine, and morpholine; and alcohol amine such as triethanol amine, diethanol amine, N-methyl diethanol. 2-amino-2-ethyl-1,3-propane diol, and choline.

The copolymer of the α-olefin-maleic anhydride represented by the Chemical Structure 2 can be synthesized or is available from the market. Specific examples of the market products thereof include, but are not limited to, T-YP 112, T-YP 115, T-YP 114, and T-YP116 (all manufactured by SEIKO PMC CORPORATION).

The styrene-(meth)acrylic copolymer can be synthesized or is available from the market. Specific examples of the market products thereof include, but are not limited to, JC-05 (manufactured by SEIKO PMC CORPORATION), ARUFRON UC-3900, ARUFRON UC-3910, and ARUFRON UC-3920 (manufactured by TOAGOSEI CO., LTD.).

Any marketed product of the hydrosoluble polyurethane resin and any synthesized hydrosoluble polyester resin can be suitably used. Specific examples of the marketed products include, but are not limited to, Takelac W-5025, Takelac W-6010, and Takelac W-5661 (manufactured by Mitsui Chemicals, Inc.).

Any marketed products of hydrosoluble polyester resins and any synthesized hydrosoluble polyurethane resins can be suitably used as the hydrosoluble polyurethane resin described above. Specific examples of the marketed products thereof include, but are not limited to, Nichigo Polyester W-0030, Nichigo Polyester W-0005530WO, and Nichigo Polyester WR-961 (manufactured by the Nippon Synthesis Chemical Industry Co., Ltd.), PESRESIN A-210, and PESRESIN A-520 (manufactured by Takamatsu Oil & Fat Co., Ltd.).

The acid value of the polymer dispersion stabilizer is preferably from 40 mgKOH/g to 400 mgKOH/g and more preferably from 60 mgKOH/g to 350 mgKOH/g. When the acid value is too small, the solubility of the alkali solution tends to be inferior. When the acid value is too large, the viscosity of the pigment tends to increase, thereby degrading discharging ink performance or reducing the dispersion stability of the pigment dispersion.

The weight average molecular weight of the polymer dispersion stabilize is preferably 20,000 or lower and more preferably from 5,000 to 20,000. When the weight average molecular weight is too small, the dispersion stability of the pigment dispersion tends to deteriorate. When the weight average molecular weight is too large, the solubility of the alkali solution tends to be inferior or the viscosity tends to increase.

The content of the polymer dispersion stabilizer is preferably from 1 part by weight to 100 parts by weight (conversion in solid portion) and more preferably from 5 parts by weight to 50 parts by weight based on 100 parts by weight of the pigment. When the content of the polymer dispersion stabilizer is too small, the effect of the polymer dispersion stabilizer tends to lose. When the content of the polymer dispersion stabilizer is too large, the ink viscosity tends to increase, thereby degrading discharging ink performance or increasing the cost.

Pigment Dispersant

In the second form, it is preferable that the coloring agent contains a pigment dispersant.

As the polymer dispersant, anionic surface active agents and nonionic surface active agents having an HLB value of from 10 to 20 are preferable.

Specific examples of the anionic surface active agent include, but are not limited to, polyoxyethylene alkyl ether acetates, alkyl benzene sulfonates (e.g., $NH_4$, Na, and Ca), alkyl disphenyl ether disulfonates (e.g., $NH_4$, Na, and Ca), sodium salts of dialkyl succinate sulfonates, formalin condensed sodium salts of naphthalene sulfonates, polyoxyethylene polycyclic phenyl ether sufuric acid esters (e.g., $NH_4$ and Na), laurates, polyoxyethylene alkyl ether sulfates, and oleates.

Among these, sodium salts of dioctyl sulfosuccinate and $NH_4$ salts of polyoxyethylene styrene phenyl ether sulfonates.

Specific examples of the nonionic surface active agents having an HLB value of from 10 to 20 include, but are not limited to, polyoxyethylene alkyl ether, polyoxyalkylene alkyl ether, polyoxyethylene polycyclic phenyl ether, sorbitan aliphatic acid esters, polyoxy ethylene sorbitan aliphatic esters, polyoxyethylene sorbitan aliphatic esters, polyoxyethylene alkyl phenyl ethers, polyoxyethylene alkyl amines, polyoxyethylene alkyl amides, and acetylene glycol.

Among these, polyoxyethylene lauryl ether, polyoxyethylene-β-naphtyl ether, polyoxyethylene sorbitan monooleate, and polyoxyethylene styrene phenyl ether are particularly preferable.

The content of the polymer dispersant is preferably from 1 part by weight to 100 parts by weight and more preferably from 10 parts by weight to 50 parts by weight based on 100 parts by weight of the pigment.

When the content of the pigment dispersant is too small, the pigment tends not to be sufficiently refined. When the content of the pigment dispersant is too large, excessive components that are not adsorbed to the pigments tend to have an impact on the ink properties, resulting in deterioration on image blurring, water resistance, and abrasion resistance.

The pigment dispersion uniformly and minutely dispersed in water by the polymer dispersant can be prepared by dissolving the polymer dispersant in an aqueous medium, adding the pigment to the solution followed by sufficient moistening, and mixing and kneading and dispersing the mixture by high speed stirring by a homogenizer, a disperser using balls such as a bead mill and a ball mill, a mixing and kneading disperser using a shearing force such as a roll mill, or an ultrasonic disperser.

However, coarse particles tend to remain after the mixing and kneading and dispersing process, which causes clogging in the inkjet nozzle or the supplying route. Therefore, such coarse particles (e.g., particle diameter: 1 μm or greater) are required to be removed by a filter or a centrifugal.

The average particle diameter (D50) of the pigment dispersion in the ink is preferably 150 nm or less and more preferably 100 nm or less. When the average particle diameter (D50) is too large, the discharging stability tends to drastically deteriorate, thereby causing clogging in the nozzle or displacing ink on a recording medium. In addition, when the average particle diameter is too small, the discharging stability tends to ameliorate, thereby improving the saturation of produced images.

In addition, as the third-form hydrodispersible coloring agent, in addition to the pigment specified above, it is preferable to use a polymer emulsion in which polymer particulates contain the pigment. The polymer emulsion in which polymer particulates contain the pigment means an emulsion in which the pigments are encapsulated in the polymer particulates or adsorbed on the surface of the polymer particulates. In this case, it is not necessary that all the pigments are encapsulated or adsorbed and some of the pigments may be dispersed in the emulsion unless they do not have an adverse impact on the effect of the present disclosure.

Specific examples of the polymers (polymer in the polymer particulates) forming the polymer emulsions include, but are not limited to, vinyl-based polymers, polyester-based polymers, and polyurethane-based polymers. In particular, the polymers specified in JP-2000-53897-A and JP-2001-139849 can be suitably used.

The content of the coloring agent in the ink is preferably from 2% by weight to 15% by weight in a solid form and more preferably from 3% by weight to 12% by weight. When the content is too small, the color of the ink tends to deteriorate and the image density tends to decrease. When the content is too large, the viscosity of the ink tends to increase, thereby degrading the ink discharging performance, which is not preferable in terms of economy.

Surface Active Agent

As the surface active agent, it is preferable to use a surface active agent that has a low surface tension, a high permeability, and a leveling property without degrading the dispersion stability irrespective of the kind of the coloring agent and the combinational use with the wetting agent. At least a surface active agent selected from the group consisting of anionic surface active agents, nonionic surface active agents, silicone-containing surface active agents, and fluorine-containing surface active agents is preferable.

Among these, silicone-containing surface active agents and fluorine-containing surface active agents are particularly preferred.

These surface active agents may be used alone or in combination.

A fluorine-containing surface active agent in which the number of carbon atoms replaced with fluorine atoms is from 2 to 16 is preferable and, 4 to 16, more preferable. When the number of replaced carbon atoms with fluorine atoms is too small, the effect of fluorine atoms may not be demonstrated. When the number of replaced carbon atoms with fluorine atoms is too large, a problem may occur with regard to the ink preservability, etc.

Specific examples of the fluorine-containing surface active agents include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain.

Among these, polyoxyalkylene ether polymer compounds having a perfluoroalkyl ether group in its side chain are particularly preferable because of its low foaming property. The fluorine-containing surface active agents represented by the following Chemical Structure 5 are more preferable.

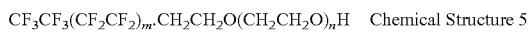 Chemical Structure 5

In the Chemical Structure 5, m represents zero or an integer of from 1 to 10. n represents 1 or an integer of from 1 to 40.

Specific examples of the perfluoroalkyl sulfonic acid compounds include, but are not limited to, perfluoroalkyl sulfonic acid and salts of perfluoroalkylsulfonic acid. Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorine-containing surface active agents are, for example, Li, Ha, K, $NH_4$, $NH_3CH_2CH_2CH$, $NH_2(CH_2CH_2OH)_2$, and $NH(CH_2CH_2OH)_3$.

Any suitably synthesized fluorine-containing surface active agents and products thereof available in the market can be also used.

Specific examples of the products available from the market include, but are not limited to, Surflon S-111, Surflon S-112, Surflon S-121, Surflon S-131, Surflon S-132, Surflon S-141, and Surflon S-145 (all manufactured by ASAHI GLASS CO., LTD.); Fluorad FC-93, FC-95, FC-98, FC-129, FC-135, FC-170C, FC-430, and FC-431 (all manufactured by Sumitomo 3M); MegaFac F-470, F-1405, and F-474 (all manufactured by DIC Corporation); Zonyl TBS, FSP, FSA, FSN-100, FSN, FSO-100, FSO, FS-300 UR (all manufactured by Du Pont Kabushiki Kaisha); FT-110, FT-250, FT-251, FT-400S, FT-150 and FT-400SW (all manufactured by Neos Company Limited); and Polyfox PF-151N (manufactured by Omnova Solutions Inc.). Among these, in terms of improvement on the printing quality, in particular the color property and the uniform dying property on paper, FS-300 of Du Pont Kabushiki Kaisha, FT-110, FT-250, FT-251, FT-400S, FT-150, and FT-400SW of Neos Company Limited, and Polyfox PF-151N of Omnova Solutions Inc. are particularly preferred.

As the fluorine-containing surface active agents, the compound represented by the Chemical Structure 6 is preferable.

1. Anionic Fluorine-Containing Surface Active Agent

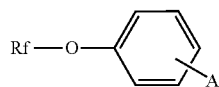

Chemical Structure 6

In the Chemical Structure 6, Rf represents a mixture of a fluorine-containing hydrophobic group represented by the Chemical Structure 7. A represents —$SO_3X$, —COOX, or —$PO_3X$, where X represents a counter cation. Specific examples of X include, but are not limited to, Li, Na, K, $NH_4$, $NH_3CH_2CH_2OH$, $NH_2(CH_2CH_2OH)_2$, and $NH(CH_2CH_2OH)_3$.

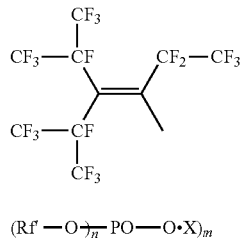

Chemical Structure 7

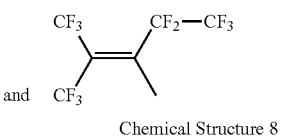

Chemical Structure 8

In the Chemical Structure 8, Rf' represents a fluorine-containing group represented by Chemical Structure 9. X represents the same as above. n is 1 or 2 and m is 2–n.

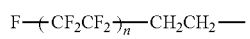

Chemical Structure 9 n independently represents an integer of from 3 to 10 in the Chemical Structure 9.

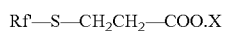

Chemical Structure 10

In the Chemical Structure 10, Rf and X are the same as above.

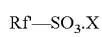

Chemical Structure 11

In the Chemical Structure 11, Rf and X are the same as above.

2. Nonionic Fluorine-Containing Surface Active Agent

Chemical Structure 12

In the Chemical Structure 12, Rf is the same as above. n represents an integer of from 5 to 20.

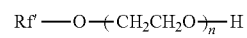

Chemical Structure 13

In the Chemical Structure 13, Rf' is the same as above. n represents 1 or an integer of from 1 to 40.

3. Amphoteric Fluorine-Containing Surface Active Agent

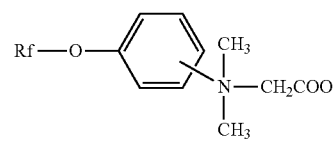

Chemical Structure 14

In the Chemical Structure 14, Rf is the same as above.

4. Olygomer Fluorine-containing Surface Active Agent

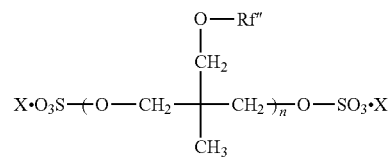

Chemical Structure 15

In the Chemical Structure 15, Rf" represents a fluorine-containing group represented by Chemical Structure 16. n represents zero or an integer of from 1 to 10. X represents the same as above.

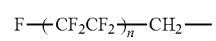

Chemical Structure 16

In the Chemical Structure 16, n represents an integer of from 1 to 4.

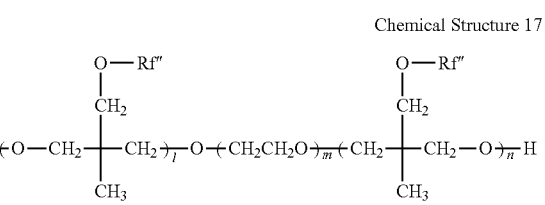

Chemical Structure 17

In the Chemical Structure 17, Rf" is the same as above. l, m, and n independently represent zero or an integer of from 1 to 10.

There is no specific limitation to the selection of the silicone-based surface active agents and a silicone-based surface active agent is preferable which is not decomposed even at a high pH. Specific examples thereof include, but are not limited to, side-chain-modified polydimethylsiloxane, both end-modified polydimethylsiloxane, one end modified polydimethylsiloxane, and side-chain both end modified polydimethylsiloxane. A polyether-modified silicone-containing surface active agent that has a polyoxyethylene group and/or a polyoxyethylene polyoxypropylene group is particularly preferable because of its good characteristics as an aqueous surface active agent.

Any suitably synthesized surface active agent and products thereof available in the market can be also used. Products available in the market are easily obtained by Byc Chemie Japan Co., Ltd., Shin-Etsu Silicone Co., Ltd., Dow Corning Toray Co., Ltd., etc.

There is no specific limit to the polyether-modified silicon-containing surface active agent. For example, a compound in which the polyalkylene oxide structure represented by the following Chemical Structure 18 is introduced into the side chain of the Si portion of dimethyl polysilooxane.

Chemical Structure 18

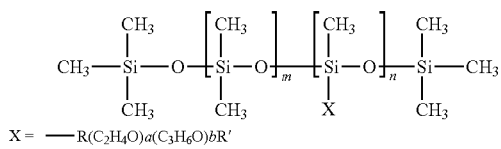

$X = \text{---}R(C_2H_4O)a(C_3H_6O)bR'$

In the Chemical Structure 18, m, n, a, and b independently represent integers. R and R' independently represent alkyl groups and alkylene groups.

Specific examples of the polyether-modified silicone-containing surface active agents include, but are not limited to, KF-618, KF-642, and KF-643 (manufactured by Shin-Etsu Chemical Co., Ltd.)

Specific examples of the anionic surface active agents include, but are not limited to, polyoxyethylene alkyl ether acetates, dodecyl benzene sulfonates, laurates, and polyoxyethylene alkyl ether sulfates.

Specific examples of the nonionic surface active agents include, but are not limited to, polyoxyethylene alkyl ether, polyoxypropylene polyoxyethylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealky amides.

The content of the surface active agents in the ink for recording is preferably from 0.01% by weight to 3.0% by weight and more preferably from 0.5% by weight to 2% by weight. When the content is too small, the effect of the surface active agent tends to be weak. When the content is too large, penetration of the ink to a recording medium tends to become excessively high, resulting in decrease in image density and occurrence of strike-through.

Penetrating Agent

The ink for recording for use in the present disclosure preferably has at least one kind of polyol compounds or glycol ether compounds having 8 to 11 carbon atoms.

The penetrating agent is different from the wetting agent mentioned above. The penetrating agent is not completely of no wettability but is less wettable than the wetting agent. Therefore, in this context, the penetrating agent is dealt with as non-wettable.

A penetrating agent having a solubility of from 0.2% by weight to 50% by weight in water at 25° C. is preferable.

Among these, 2-ethyl-1,3-hexane diol (solubility: 4.2% at 25° C.) and 2,2,4-trimethyl-1,3-pentane diol (solubility: 2.0% at 25° C.) are particularly preferable.

Specific examples of the other polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

Any other permeating agents that can be dissolved in ink and adjusted to have desired characteristics can be used in combination. Specific examples thereof include, but are not limited to, alkyl and aryl ethers of polyols such as diethylene glycol monophenylether, ethylene glycol monophenylether, ethylene glycol monoaryl ether, diethylene glycol monophenyl ether, diethylene glycol monobutyl ether, propylene glycol monobutyl ether, and tetraethylene glycol chlorophenyl ether and lower alcohols such as ethanol.

The content of the permeating agent in the ink for recording is preferably from 0.1% by weight to 40% by weight. When the content is too small, the obtained image may not dry soon, resulting in an blurred image. When the content is too large, the dispersion stability of the coloring agent may deteriorate, nozzles tends to clog, and the permeability tends to be excessively high, which leads to a decrease in the image density and occurrence of strike-through.

Hydrodispersible Resin

Hydrodispersible resins have excellent film-forming (image forming) property, water repellency, water-resistance, and weathering properties. Therefore, these are suitable for image recording requiring high water-resistance and high image density.

Specific examples thereof include, but are not limited to, condensation-based resins, addition-based resins, and natural polymers.

Specific examples of the condensation-based resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based resins include, but are not limited to, polyolefin resins, polystyrene resins, polyvinyl alcohol resins, polyvinyl ester resins, polyacrylic acid resins, and unsaturated carboxylic acid resins.

Specific examples of the natural resins include, but are not limited to, celluloses, rosins, and natural rubber.

Among these, polyurethane resin particulates, acrylic-silicone resin particulates, and fluorine-containing resin particulates are preferable. These can be used alone or in combination.

As the fluorine-containing resins, fluorine-containing resin particulates having fluoro-olefin units are preferable. Among these, fluorine-containing vinyl ether resin particulates formed of fluoro-olefin units and vinyl ether units are particularly preferable.

There is no specific limit to the selection of the fluoro-olefin units. Specific examples thereof include, but are not limited to, $\text{---}CF_2CF_2\text{---}$, $\text{---}CF_2CF(CF_3)\text{---}$, and $\text{---}CF_2CFCl\text{---}$.

There is no specific limit to the selection of fluoro-olefin units. For example, the compounds represented by the following Chemical Structures 19 are suitable.

Chemical Structures 19

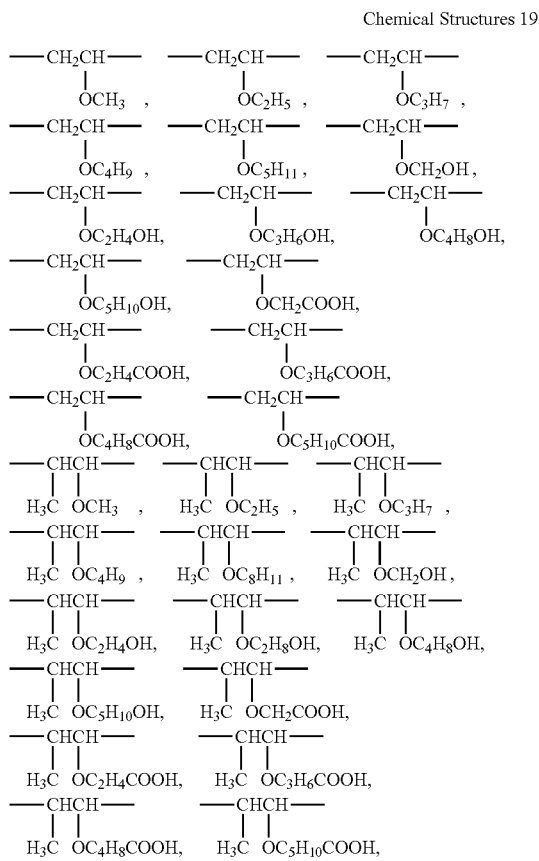

As the fluorine-containing vinyl ether resin particulates formed of fluoro-olefin units and vinyl ether units, alternate copolymers in which fluoro-olefin units and vinyl ether units are alternately co-polymerized are preferable.

Any suitably synthesized fluorine-containing resin particulates and products thereof available in the market can be also used. Specific examples of the products available in the market include, but are not limited to, FLUONATE FEM-500, FEM-600, DICGUARD F-52S, F-90, F-90M, F-90N, and AQUA FURAN TE-5A (all manufactured by DIC Corporation); and LUMIFLON FE4300, FE4500, and FE4400, ASAHI GUARD AG-7105, AG-950, AG-7600, AG-7000, and AG-1100 (all manufactured by ASAHI GLASS CO., LTD.).

The hydrodispersible resins can be used as homopolymers or complex resins as copolymers. Any of single phase structure type, core-shell type, and power feed type emulsions is suitable.

A hydrodispersible resin that has a hydrophilic group with self dispersiblity or no dispersibility while dispersibility is imparted to a surface active agent or a resin having hydrophilic group can be used as the hydrodispersible resin. Among these, emulsions of resin particles obtained by emulsification polymerization or suspension polymerization of ionomers or unsaturated monomers of a polyester resin or polyurethane resin are most suitable.

In the case of emulsification polymerization of an unsaturated monomer, since a resin emulsion is obtained by reaction in water to which an unsaturated monomer, a polymerization initiator, a surface active agent, a chain transfer agent, a chelate agent, pH adjusting agent, etc. are added, it is easy to obtain a hydrodispersible resin and change the resin components. Therefore, a hydrodispersible resin having target properties is easily obtained.

Specific examples of the unsaturated monomers include, but are not limited to, unsaturated carboxylic acids, mono-functional or poly-functional (meth)acrylic ester monomers, (meth)acrylic amide monomers, aromatic vinyl monomers, vinyl cyano compound monomers, vinyl monomers, arylated compound monomers, olefin monomers, dien monomers, and oligomers having unsaturated carbon. These can be used alone or in combination.

When these are used in combination, resin properties can be easily reformed. The resin properties can be reformed by polymerization reaction and graft reaction using an oligomer type polymerization initiators.

Specific examples of the unsaturated carboxylic acids include, but are not limited to, acrylic acid, methacrylic acid, itaconic acid, fumaric acid, and maleic acid.

Specific examples of the mono-functional (meth)acrylic ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methcryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Specific examples of poly-functional (meth)acrylic ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2'-bis(4-methacryloxy diethoxyphenyl) propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacryalte, tetramethylo methane tetraacrylate, pentaerythritol tetraacrylate, and dipentaerythritol hexaacrylate.

Specific examples of the (meth)acrylic monomers include, but are not limited to, acrylic amides, methacrylic amides, N,N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrolidone, vinyl sulfonic acid and its salts, vinyl trimethoxy silane, and vinyl triethoxy silane.

Specific examples of the arylated compound monomers include, but are not limited to, aryl sulfonic acid and its salts, aryl amine, aryl chloride, diaryl amine, and diaryl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group.

Since breaking in molecule chains such as dispersion destruction and hydrolytic cleavage occurs to the hydrodispersible resins in a strong alkali or strong acid environment, pH is preferably from 4 to 12, more preferably from 6 to 11, and furthermore preferably from 7 to 9 in terms of the miscibility with the hydrodispersible coloring agent.

The average particle diameter (D50) of the hydrodispersible resin is related to the viscosity of the liquid dispersion. If the composition is the same, the viscosity at the same solid portion increases as the particle diameter decreases.

To avoid preparing ink having an excessively high viscosity, the average particle diameter (D50) of the hydrodispersible resin is preferably 50 nm or more. In addition, particles having a larger particle diameter than the size of the nozzle mouth of the inkjet head are not usable. When large particles smaller than the nozzle mouth are present in the ink, the discharging property of the ink deteriorates. The average particle diameter (D50) of the hydrodispersible resin is preferably 200 nm or less and more preferably 150 nm or less in order not to degrade the discharging property.

In addition, preferably the hydrodispersible resin has a feature of fixing the hydrodispersible coloring agent on a recording medium (typically, paper) and forms a film at room temperature to improve the fixing property of the coloring material. Therefore, the minimum film-forming temperature (MFT) of the hydrodispersible resin is preferably 30° C. or lower.

In addition, when the glass transition temperature of the hydrodisdpersible resin is too low (e.g., −40° C. or lower), the viscosity of the resin film tends to increase, thereby causing the obtained image sheet to increase tackiness. Therefore, the glass transition temperature of the hydrodisdpersible resin is preferably −30° C. or higher.

The content of the hydrodisdpersible resin in the ink for recording is preferably from 1% by weight to 15% by weight and more preferably from 2% by weight to 7% in a solid form. The content of the solid portion in the coloring agent, the pigment in the coloring agent, and the hydrodisdpersible resin can be measured by, for example, a method of separating only the coloring agent and the hydrodisdpersible resin from the ink.

When the pigment is used as the coloring agent, the ratio of the coloring agent to the hydrodisdpersible resin can be measured by evaluating the mass decreasing ratio by thermal mass analysis.

In addition, when the molecule structure of the coloring agent is known, it is possible to quantify the solid portion of the coloring agent using NMR for pigments or dyes and fluorescent X ray analysis for heavy metal atoms and inorganic pigments, metal-containing organic pigments, and metal-containing dyes contained in the molecule structure.

The ink for use in the present disclosure normally has a moisture of greater than 50% by weight. Since the total amount of the resin and the pigment is greater than 3% by weight, the solvent evaporation ratio is from 50% by weight to 97% by weight.

Other Components

There is no specific limit to the selection of the other components. Optionally, pH adjusting agents, antisepsis and anti-fungal agents, chelate reagents, anti-corrosion agents, anti-oxidants, ultraviolet absorbers, oxygen absorbers, and photostabilizing agents can be blended in the ink of the present disclosure.

Any pH adjusters that can adjust pH of prescribed ink to be from 7 to 11 without having an adverse impact on the ink can be used. Specific examples thereof include, but are not limited to, alcohol amines, alkali metal hydroxides, ammonium hydroxides, phosphonium hydroxides, and alkali metal carbonates.

When the pH is too high or too low, the head of inkjet and an ink supplying unit tends to be dissolved, which results in modification, leakage, bad discharging performance of the ink, etc.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Specific examples of the chelate reagents include, but are not limited to, ethylene diamine sodium tetraacetate, nitrilo sodium triacetate, hydroxyethylethylene diamine sodium triacetate, diethylene triamine sodium quinternary acetate, and uramil sodium diacetate.

Specific examples of the anti-corrosion agents include, but are not limited to, acid sulfite, thiosodium sulfate, ammonium thiodiglycolate, diisopropyl ammonium nitride, pentaerythritol quaternary nitdride, and dicyclohexyl ammonium nitride.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the phenol-based anti-oxidants (including hindered phenol-based anti-oxidants) include, but are not limited to, butylated hydroxy anisol, 2,6-di-tert-butyl-4- ethylphenol, stearyl-β-(3,5-di-tert-butyl-4-hydroxyphenyl) propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis{1,1-dimethyl-2-[β-(3-tert-butyl-4-hydroxy-5-methylphenonl)propyonyloxy]ethyl}-2,4,8-10-tetraoxa spiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Specific examples of the amine-based anti-oxidants include, but are not limited to, phenyl-β-naphtylamine, α-naphtyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxy anisole, 2,2'-methylenebis (4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane, and 1,1,3-tris(2-methyl-4-hydroxy-5-tert-butylphenyl)butane.

Specific examples of the sulfur-based anti-oxidants include, but are not limited to, dilauryl-3,3'-thio dipropionate, distearyl thiodipropionate, laurylstearyl thiodipropionate, dimyristyl-3,3'-thiodipropionate, distearyl-β,β'-thiodipropionate, 2-mercaptobenzo imidazole, and dilauryl sulfide.

Specific examples of phosphorous-based anti-oxidants include, but are not limited to, triphenylphosphite, octadecylphosphite, triisodecylphosphite, trilauryltrithiophosphite, and trinonylphenyl phosphite.

Specific examples of the ultraviolet absorbers include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

Specific examples of the benzophenone-based ultraviolet absorbers include, but are not limited to, 2-hydroxy-4-n-octoxybenzophenone, 2-hydroxy-4-n-dodecyloxy benzophenone, 2,4-dihydroxy benzophenone, 2-hydroxy-4-methoxybenzophenone, and 2,2',44'-tetrahydroxy benzophenone.

Specific examples of the benzotriazole-based ultraviolet absorbers include, but are not limited to, 2-(2'-hydroxy-5'-tert-octylphenyl)benzo triazole, 2-(2'-hydroxy-5'-methylphenyl)benzo triazole, 2-(2'-hydroxy-4'-octoxyphenyl) benzo triazole, and 2-(2'-hydroxy-3'-tert-butyl-5'-methylphenyl)-5-chlorobenzo triazole.

Specific examples of the salicylate-based ultraviolet absorbers include, but are not limited to, phenyl salicylate, p-tert-butylphenyl salicylate, and p-octylphenyl salicylate.

Specific examples of the cyanoacrylate-based ultraviolet absorbers include, but are not limited to, ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex salt-based ultraviolet absorbers include, but are not limited to, nickel-bis (octylphenyl)sulfide, 2,2'-thiobis(4-tert-octyl ferrate)-n-butylamine nickel (II), 2,2'-thiobis(4-tert-octyl ferrate)-2-ethylhexyl amine nickel (II), and 2,2'-thiobis(4-tert-octyl ferrate)triethanol amine nickel (II).

The ink for ink jet recording for use in the present disclosure is manufactured by dispersing or dissolving the coloring agent, the hydrosoluble organic solvent, a surface active agent, and water with optional components such as a permeating agent and a hydrodispersible resin dispersed or dissolved in an aqueous medium for use followed by stirring and mixing, if desired.

Dispersion is conducted by a sand mill, a homogenizer, a ball mill, a paint shaker, an ultrasonic dispersing agent, etc. Stirring and mixing can be conducted by a stirrer having a stirring wing, a magnetic stirrer, a high speed dispersing device, etc.

There is no specific limit to the characteristics of the ink for inkjet recording and any suitable ink can be selected. For example, the viscosity and the surface tension with in the following ranges are preferable.

The viscosity of the ink for recording is from 3 mPa·s to 20 mPa·s at 25° C. When the ink viscosity is 3 mPa·s or greater, the printing density and the printing quality are improved. When the ink viscosity is 20 mPa·s or less, a suitable ink discharging property is secured.

The viscosity can be measured by a viscometer (RL-550, manufactured by TOKI SANGYO CO., LTD.) at 25° C.

The surface tension of the ink for recording is preferably 35 mN/m or less and more preferably 32 mN/m or less. When the surface tension is too strong, the leveling of the ink on a recording medium tends to hardly occur, thereby prolonging the drying time.

There is no specific limit to the selection of colors of the ink for recording for use in the present disclosure. For example, yellow, magenta, cyan, and black are suitable. When an ink set having at least two kinds of colors is used for recording, multiple color images are produced. When an ink set having all the color combinations is used, full color images are formed.

The ink for recording for use in the present disclosure is used in any printer having an inkjet head such as a piezoelectric element type in which ink droplets are discharged by transforming a vibration plate forming the wall of the ink flowing route using a piezoelectric element as a pressure generating device to press the ink in the ink flowing route as described in JP-H2-51734-A; a thermal type in which bubbles are produced by heating ink in the ink flowing route with a heat element as described in JP-S61-59911-A; and an electrostatic type in which ink droplets are discharged by transforming a vibration plate by a force of electrostatic generated between the vibration plate and the electrode while the vibration plate and the electrode are provided facing each other as described in JP-H6-71882-A).

The ink for recording for use in the present disclosure is suitably used for inkjet recording, a fountain pen, a balling-point pen, a magic marker, a felt-tip pen, etc. In particular, this ink can be suitably used in an image forming apparatus (typically, printer). For example, printers in which recording media and the ink for recording are heated to 50° C. to 200° C. when, before, or after printing to accelerate fixing of the image are suitable and particularly preferable for an inkjet recording medium and ink set and an inkjet recording method.

Set of Inkjet Recording Ink and Recording Medium

The inkjet recording medium and ink set of the present disclosure is a combination of the ink for inkjet recording and the recording medium described above.

Recording Medium

The recording medium has a substrate and a coated layer on at least one side of the substrate. The transfer amount of pure water to the recording medium having the coated layer is 2 ml/m$^2$ to 35 ml/m$^2$ during a contact time of 100 ms and 3 ml/m$^2$ to 40 ml/m$^2$ during a contact time of 400 ms when measured by a liquid dynamic absorption tester at 23° C. and 50% RH. In addition, as long as the transfer amount of pure water to the recording medium having the coated layer is within the ranges, there is no specific limit to the recording medium so that any of gloss paper, special paper, cloth, film, a transparent sheet, plain paper, etc. can be suitably used.

When the transfer amount of pure water during a contact time of 100 ms is too small, beading (non-uniform density) tends to occur. When the transfer amount of pure water during a contact time of 100 ms is too large, the ink dot diameter after recording tends to be smaller than desired. Therefore, the recording medium for use in the present disclosure has a transfer amount of pure water to the recording medium having the coated layer measured by a liquid dynamic absorption tester at 23° C. and 50% RH is from 2 ml/m$^2$ to 35 ml/m$^2$, preferably 2 ml/m$^2$ to 25 ml/m$^2$, and more preferably from 2 ml/m$^2$ to 10 ml/m$^2$ during a contact time of 100 ms.

When the transfer amount of pure water during a contact time of 400 ms is too small, the drying property tends to deteriorate, resulting in spur marks. When the transfer amount of pure water during a contact time of 400 ms is too large, the gloss of the imaging portion after drying tends to be low. Therefore, the recording medium for use in the present disclosure has a transfer amount of pure water to the recording medium having the coated layer is from 3 ml/m$^3$ to 45 ml/m$^2$, preferably 3 ml/m$^3$ to 25 ml/m$^2$, and more preferably from 3 ml/m$^3$ to 10 ml/m$^2$ during a contact time of 400 ms when measured by a liquid dynamic absorption tester at 23° C. and 50% RH.

Substrate

There is no specific limitation to the selection of the substrate. For examples, paper mainly formed of wood fiber and a sheet material such as non-woven cloth mainly formed of wood fiber and synthesized fiber.

There is no specific limitation to the selection of the paper. For examples, wood pulp and waste paper pulp are used.

Specific examples of the wood pulp include, but are not limited to, L-Breached Kraft Pulp (LBKP), N-Breached Kraft Pulp, N-Breached Sulfite Pulp (NBSP), L-Breached Sulfite Pulp (LBSP), Ground Pulp (GP), and Thermo-Mechanical Pulp (TMP).

Specific examples of the materials for the waste paper pulp include, but are not limited to, {waste paper (broke) of} high quality white paper without print, {waste paper (broke) of} lined white paper without print, {waste paper (broke) of} high quality cream paper without print, {waste paper (broke) of} cardboard, {waste paper (broke) of} medium quality paper without print, (waste paper of) white paper with black print, {waste paper (broke) of} woody paper without print, (waste paper of) white paper with color print, (waste paper of) white paper or art paper with color print, {waste paper (broke) of} art paper without print, (waste paper of) medium quality paper with color print, (waste paper of) woody paper with print, waste paper of newspaper, waste paper of magazine, etc. specified in waste paper quality specification list by Paper Recycling Promotion Center.

To be specific, these are chemical pulp paper and high-yield pulp containing paper, which are waste paper of paper and paper board such as print paper such as non-coated computer paper, thermal paper, and pressure-sensitive paper; OA waste paper such as plain photocopying paper; coated paper such as art paper, coated paper, micro-coated paper, and matt coated paper; non-coated paper such as high-quality paper, high quality colored paper, note, letter paper, package paper, cover paper, medium quality paper, newsprint paper, woody paper, super wrapping paper, imitation Japanese vellum, machine glazed poster paper, and polyethylene-coated paper. These can be used alone or in combination.

The waste paper pulp is manufactured by a combination of the following four processes:

(1): In maceration, waste paper is subjected to mechanical force and drugs by a pulper to make unstiffened fiber, from which the printed ink is detached.

(2): In dust removal, foreign objects such as plastic contained in waste paper and dirt are removed by a screen, a cleaner, etc.

(3): In removal of ink, the printed ink detached from the fiber by using a surface active agent is removed outside the system by a flotation method or a washing method.

(4) In bleaching, the degree of white is improved using oxidation and reduction.

When the waste paper pulp is mixed, the mixing ratio of the waste paper pulp in all the pulp is preferably 40% or less considering curling after recording.

As the internal loading material for use in the substrate, for example, known pigments are used as white pigment.

Specific examples of the white pigments include, but are not limited to, inorganic white pigments such as light calcium carbonate, heavy calcium carbonate, kaolin, clay, tulc, calcium sulfate, barium sulfate, titanium dioxide, zinc oxide, zinc sulfide, zinc carbonate, satin white, aluminum silicate, diatom earth, calcium sillicate, magnesium silicate, synthesized silica, aluminum hydroxide, alumina, lithopone, zeolite, magnesium carbonate, and magnesium hydroxide: organic pigments such as styrene-based plastic pigment, acrylic-based plastic pigments, polyethylene, microcapsule, urea resin, and melamine resins. These can be used alone or in combination.

As the internal sizing agents for use in sheet-making the substrate, for example, neutral rosin-based sizing agents, alkenyl succinic anhydride (ASA), alkyl ketene dimer (AKD), and petroleum resin sizing agents for use in neutral paper-making are used. Among these, neutral rosin sizing agents and alkenyl succinic anhydride are particularly preferable.

The alkyl ketene dimers have an excellent sizing effect, meaning that the addition amount is less. However, it reduces the friction index of the surface of a recording medium so that the recording medium tends to become too smooth, which is not preferable in terms of the transferability during inkjet recording.

There is no specific limit to the thickness of the substrate. The layer thickness thereof can be determined and preferably ranges from 50 μm to 300 μm. The weight of the substrate is preferably from 45 g/m$^2$ to 290 g/m$^2$.

Coated Layer

The coated layer includes a pigment and a binder resin and optionally contains a surface active agent and other components.

As the pigments, inorganic pigments, or a combination thereof inorganic pigments and organic pigments can be used.

Specific examples of the inorganic pigments include, but are not limited to, kaolin, tulc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite.

Among these, kaolin has an excellent gloss demonstration and is particularly preferable to make the texture close to that of off-set printing paper.

With regard to kaolin, there are delaminated kaolin, baked kaolin, engineered kaolin by surface-remodeling. Considering the gloss demonstration, kaolin having a particle size distribution in which particles having a particle diameter of 2 μm or less occupy 80% or more is preferable.

The addition amount of kaolin is preferably 50 parts by weight or more based on 100 parts by weight of the binder resin. When the addition amount is too small, the gloss tends to deteriorate. Although there is no specific upper limit to the addition amount, considering the fluidity, in particular, thickening under a high shearing force, the addition amount of kaolin is 90 parts by weight or less in terms of coating suitability.

Specific examples of the organic pigments include, but are not limited to, aqueous liquid dispersion of particles of styrene-acrylic copolymer, particles of styrene-butadien copolymer, polystyrene particles, and polyethylene particles. These can be used alone or in combination.

Since the organic pigments have excellent gloss demonstration, the specific gravity thereof is smaller than that of an inorganic pigment, it is possible to obtain a bulky coated layer having a high gloss with good surface covering property.

The addition amount of the organic pigment is preferably from 2 parts by weight to 20 parts by weight based on 100 parts by weight of the total pigment in the coated layer. When the addition amount is too small, such a coated layer is not easily obtained. When the addition amount is too large, the fluidity of the coating liquid tends to deteriorate, thereby degrading the coating operation property. Also, this is not preferable in terms of economy.

The organic pigments are classified into solid type, hollow type, doughnut type, etc. Considering the balance of the demonstration of gloss, the surface covering, and the fluidity of the liquid application, the average particle diameter (D50) preferably has 0.2 μm to 3.0 μm and more preferably a hollow type having a void ratio of 40% or more.

As the binder resin, aqueous resins are preferable.

As the aqueous resins, at least one of hydrosoluble resins and hydrodispersible resins are preferable.

There is no specific limit to the hydrosoluble resins and any known hydrosoluble resins can be suitably used. Specific examples thereof include, but are not limited to, polyvinyl alcohol, modified polyvinyl alcohols such as anion-modified polyvinyl alcohol, cation-modified polyvinyl alcohol, and acetal-modified polyvinyl alcohol; polyurethane; polyvinyl pyrolidone and modified polyvinyl pyrolidones such as copolymers of polyvinyl pyrolidone and vinyl acetate, copolymers of vinyl pyrolidone and dimethyl aminoethyl methacrylic acid; copolymers of quaternarized vinyl pyrolidone and dimethyl aminoethyl methacrylic acid; and copolymers of vinyl pyrolidone and methacrylic amide propyl trimethyl ammonium chloride; celluloses such as carboxymethyl cellulose, hydroxyethyl cellulose, and hydroxy propyl cellulose; modified celluloses such as cationized hydroxyethyl cellulose; synthetic resins such as polyesters, polyacrylates, melamine resins, their modified products, and copolymers of polyesters and polyurethane; poly(meth)acrylic resins, poly(meth)acrylic amides, oxidized starch, phosphate starch, self-modified starch, cationized starch, other modified starches, polyethylene oxide, sodium polyacrylates, and sodium alginate. These can be used alone or in combination.

Among these, in terms of ink absorbing, polyvinyl alcohol, cation-modified polyvinyl alcohol, acetal-modified polyvinyl alcohol, polyesters, polyurethanes, and copolymers of polyester and polyurethane.

There is no specific limit to the hydrodispersible resins and any known hydrodispersible resins can be suitably used. Specific examples thereof include, but are not limited to, polyvinyl acetate, copolymers of ethylene and vinyl acetate, polystyrene, copolymers of styrene and (meth)acrylate, (meth)acrylate polymers, copolymers of vinyl acetate and (meth)acrylate, styrene and butadiene copolymers, ethylene and propylene copolymers, polyvinyl ethers, silicone and acrylic copolymers. In addition, optionally, a cross-linking agents such as methylolated melamine, methylolated urea, methylolated hydroxy propylene urea, and isocyanate can be contained. Copolymers having a self-cross-linking property that contains a unit such as N-methylol acrylic amide are also suitable.

These aqueous resins cane be use alone or in combination.

The content of the aqueous resin is from 2 parts by weight to 100 parts by weight and preferably from 3 part by weight to 50 parts by weight based on 100 parts by weight of the pigment. The addition amount of the aqueous resins is determined in order for the recording medium to have a target liquid absorption property.

When a coloring agent having a hydrodispersiblity is used as the coloring agent, it is not necessary to blend the cationic organic compound in the coated layer but the cationic organic compound can be suitably used without specific limits.

Specific examples of the cationic organic compounds blended in the coated layer include, but are not limited to, primary to tertiary amines that form insoluble salts through reaction with a sulfonic acid group, a carboxylic group, an amino group, etc. in a direct dye or an acidic dye in an aqueous ink, and monomers, oligomers, and polymers of quaternary ammonium salts. Among these, oligomers and polymers are preferable.

Specific examples of the cationic organic compounds include, but are not limited to, dimethyl amine epichlorohydrin condensation compounds, dimethyl amine ammonium epichlorohydrin condensation compounds, poly(methacrylic acid trimethyl aminoethyl.methyl sulfate), copolymers of diarylamine chloride.acrylic amide, poly(diarylamine chloride.sulfur dioxide), polyaryl amine chloride, poly(arylamine chloride.diarylamine chloride), copolymers of acrylic amide.diaryl amine, polyvinyl amine copolymers, dicyane diamde, dicyane diamide.ammonium chloride.urea.formaldehyde condensation compound, polyalkylene polyamine.dicyane diamide ammonium salt condensation product, dimethyldiaryl ammonium chloride, polydiarylmethyl amine chloride, poly(diaryldimethyl ammonium chloride), poly(diaryldimethyl ammonium chloride.sulfur dioxide), poly(diaryldimethylammonium chloride.diaryl amine chloride derivatives), arcylic amide.diaryl dimethyl ammonium chloride copolymers, acrylate.acrylic amide.diaryl amine chloride copolymers, polyethylne imine, ethylene imine derivatives of acrylic amine polymers, etc., and modified polyethylene imine alkylene oxides. These can be used alone or in combination.

Among these, it is preferable to use cationic organic compounds having low molecular weights such as dimethyl amine epichlorohydrin condensation compounds and polyaryl amine chlorides and other cationic organic compounds having relatively high molecular weights such as poly(diaryldimethyl ammonium chloride) in combination.

In such a combinational use, the image density is improved more than a single use of such a cationic organic compound, thereby reducing feathering.

The cation equivalent of the cationic organic compound by the colloid titration method (using polyvinyl potassium sulfate and toluidine blue) is preferably from 3 meq/g to 8 meq/g. When the cationic equivalent is within this range, good results are obtained within the range of the dry attachment amount.

When the cation equivalent is measured by the colloid titration method, the cationic organic compound is diluted by distilled water such that the solid portion is 0.1% by weight with no pH adjustment.

The drying attachment amount of the cationic organic compounds is preferably from 0.3 $g/m^2$ to 2.0 $g/m^2$. When the drying attachment amount is too small, the image density is not easily improved or reducing feathering is not easily achieved.

There is no specific limit to the surface active agent contained in the coated layer and any known surface active agent is suitably used. Any of anionic active agents, cationic active agents, amphoteric active agents, and non-ionic active agent can be used. Among these, non-ionic active agents are particularly preferred. By adding the surface active agent, the water resistance of the image is improved and the image density becomes high, thereby reducing the bleeding.

Specific examples of the non-ionic active agents include, but are not limited to, adducts of higher alcohol with ethylene oxides, adducts of alkyl phenol with ethylene oxides, adducts of aliphatic acid with ethylene oxide, adducts of aliphatic acid with ethylene oxide, adducts of polyol alicphatic ester with ethylene oxide, adducts of higher aliphatic acid amine with ethylene oxide, adducts of aliphatic acid amide ethylene oxide, adducts of fat with ethylene oxide, adducts of polypropylene glycol with ethylene oxide, aliphatic acid esters of glycerol, aliphatic acid esters of pentaerythritol, aliphatic acid esters of sorbitol and sorbitane, aliphatic acid esters of sucrose, alkyl ethers of polyol, and aliphatic acid amides of alkanol amines. These can be used alone or in combination.

There is no specific limit to the polyol and any known polyol is suitably used.

Specific examples thereof include, but are not limited to, glycerol, trimethylol propane, pentaerythritol, sorbitol, and sucrose.

In addition, with regard to the adducts of ethylene oxide, it is also suitable to use adducts in which part of ethylene oxide is substituted by alkylene oxides such as propylene oxide or butylene oxide unless the substitution has an adverse impact on the hydrosolubility. Preferably, the substitution ratio is 50% or less.

The HLB (hydrophilicity/lipophilicity) of the non-ionic active agent is preferably from 4 to 15 and more preferably from 7 to 13.

The addition amount of the surface active agent is preferably from 0 to 10 parts by weight and more preferably from 0.1 to 1.0 parts by weight based on 100 parts by weight of the cationic organic compound.

Other components can be added to the coated layer unless they have an adverse impact on the target or the effect of the present disclosure. As the other components, aluminum powder, pH adjustment agents, anti-corrosion agents, and antioxidizing agents are specified.

There is no specific limit to the method of forming the coated layer. For example, methods are used in which liquid application for the coated layer is applied to the substrate or the substrate is impregnated therein.

There is no specific limit to the method of impregnation or application (coating) of the liquid application for the coated layer. For example, the liquid can be coated by a conventional size pressing machine, a gate roll size pressing machine, a film transfer size pressing machine, a blade coater, a rod coater, an air knife coater, and a curtain coater. In terms of the cost, the substrate is impregnated in the liquid or the liquid is applied by a conventional size pressing machine, a gate roll size pressing machine, a film transfer size pressing machine, etc. installed onto a paper machine first followed by finishing using an on-machine coater.

There is no specific limit to the attachment amount of the liquid application. The attachment amount of solid portion preferably ranges from 0.5 g/m$^2$ to 20 g/m$^2$ and more preferably from 1 g/m$^2$ to 15 g/m$^2$ The coated layer can be dried after impregnation or application. There is no specific limit to the drying temperature. The drying temperature preferably ranges from about 100° C. to about 250° C.

The recording medium may have a rear layer on the rear side of the substrate and/or another layer formed between the substrate and the coated layer and/or the rear layer and the substrate. Also a protective layer can be formed on the coated layer. Each layer can have a single layer structure or multi-layer structure.

As the recording medium, in addition to the recording medium for inkjet recording, plain printing paper in the market, coated paper for offset printing, and coated paper for gravure printing can be used.

The printing paper in the market is cast-coated paper, art paper (A0 size, A1 size), A2 size coated paper, A3 size coated paper, B2 size coated paper, light-weight coated paper, micro-coated paper, etc. used for commercial printing or publishing printing such as offset printing and gravure printing.

Specific examples thereof include, but are not limited to, Aurora Coat (manufactured by Nippon Paper Industries Co., Ltd.) and (POD Gloss Coat, manufactured by Oji paper Co., Ltd.).

Ink Cartridge

The ink cartridge has a container to contain the ink for inkjet recording for use in the present disclosure and other optionally selected parts.

There is no specific limit to the container. Any form, any structure, any size, and any material can be suitably selected. For example, a container having at least an ink bag formed of aluminum laminate film, a resin film, etc. can be suitably used.

The ink cartridge is described in detail with reference to FIGS. 1 and 2.

FIG. 1 is a schematic diagram illustrating an example of the ink cartridge. FIG. 2 is a variation example of the ink cartridge illustrated in FIG. 1.

As illustrated in FIG. 1, the ink for inkjet recording described above is filled into an ink bag 241 from an ink inlet 242. Subsequent to evacuation of air, the ink inlet 242 is closed by fusion. When the ink is used, a needle provided to an inkjet recording device (main part) 101 illustrated in FIG. 3 is thrust in an ink outlet 243 formed of rubber in order that that the ink is provided to the inkjet recording device 101.

The ink bag 241 is formed of a packaging material such as aluminum laminate film having no air permeability. The ink-bag 241 is accommodated in a cartridge case 244 made of plastic as illustrated in FIG. 2 and detachably attachable to an inkjet recording device for use.

An ink cartridge 201 accommodates the ink for inkjet recording for use in the present disclosure and can be used by detachably attaching to an inkjet recording device, in particular, the inkjet recording device described later.

Inkjet Recording Method and Inkjet Recording Device

In the inkjet recording method for use in the present disclosure, images are recorded by discharging the ink for inkjet recording to a recording medium having a coated layer on at least one side thereof. The recording medium has a transfer amount of pure water to the recording medium having the coated layer is 2 ml/m$^2$ to 35 ml/m$^2$ during a contact time of 100 ms and 3 ml/m$^2$ to 40 ml/m$^2$ during a contact time of 400 ms when measured by a liquid dynamic absorption tester at 23° C. and 50% RH. The ink for inkjet recording contains at least a hydrosoluble organic solvent, a surface active agent, and a coloring agent. The hydrosoluble organic solvent contains at least an amide compound represented by the following Chemical Structure 1.

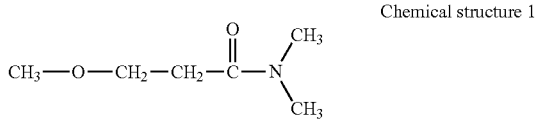
Chemical structure 1

The method of forming images, etc. on the recording medium by the ink for inkjet recording includes an ink flying process preferably with suitably-selected optional processes such as stimulus generating process and a control process.

The inkjet recording device that conducts the recording method includes an ink flying device preferably with optional suitably-selected devices such as a stimulus generating device and a control device.

As described above, the method of inkjet recording of the present disclosure is demonstrated by the inkjet recording device and the ink flying process is suitably conducted by the ink flying device. In addition, the other processes are suitably conducted by the other corresponding devices.

Ink Flying Process and Ink Flying Device

The ink flying process applies a stimulus (energy) to the ink for recording to fly the ink to form an image on a recording medium.

The ink flying device applies the stimulus (energy) to the ink for recording to fly the ink to form the image on the recording medium. There is no specific limit to the selection of the ink flying device. For example, nozzles for ink discharging are specified.

With regard to the device, it is preferable that at least part of the liquid room, the liquid resistance unit, the vibration board, and the nozzle member of the inkejet head is formed of materials containing at least one of silicone and nickel.

In addition, the diameter of the inkjet nozzle is preferably 30 μm or less and more preferably from 1 μm to 20 μm.

The stimulus (energy) can be generated by the stimulus generating device, etc. There is no specific limit to the stimulus. For example, heat (temperature), pressure, vibration, and light are suitable. These can be used alone or in combination. Among these, heat and pressure are preferable.

Specific examples of the stimulus generating device include, but are not limited to, a heating device, a pressing device, a piezoelectric element, a vibration generator, an ultrasonic oscillator, and light. To be specific, for example, a piezoelectric actuator, a thermal actuator utilizing phase changes due to film evaporation using a thermoelectric conversion element such as a heat resistance, a shape-memory-alloy actuator using metal phase change by temperature change, and an electrostatic actuator using an electrostatic force can be used.

There is no specific limit to how the ink for recording flies. How it flies changes depending on the kind of stimuli. When the stimulus is heat, for example, there is a method in which the thermal energy is imparted to the ink for recording in the recording head by using a thermal head, etc. to generate bubbles in the ink whose pressure discharges the ink from the nozzle holes as droplets.

When the stimulus is pressure, for example, there is a method of applying a voltage to a piezoelectric element attached to the position referred to as a pressure room situated in an ink passage in the recording head to bend the piezoelectric element, thereby reducing the volume of the pressure room to discharge ink droplets from the nozzle holes of the recording head.

The size of the droplet of the ink for recording is preferably from, for example, $3 \times 10^{-15}$ to $40 \times 10^{-15}$ m$^3$ (from 3 pl to 40 pl). The discharging speed is preferably from 5 m/s to 20 m/s, its driving frequency is preferably 1 kHz or higher, and the definition is preferably 300 dpi or greater.

There is no specific limit to the control device as long as the device can control the movement of each device. Any controlling device can be suitably selected and used. For example, devices such as a sequencer and a computer can be used.

An example of the inkjet recording of the present disclosure conducted by a serial type inkjet recording device is described with reference to the accompanying drawings.

The inkjet recording device illustrated in FIG. 3 includes the inkjet recording device (main part) 101, a paper feeder tray 102 to feed paper to the main part 101, a discharging tray 103 installed onto the main part 101 to stock paper on which an image is formed (recorded), and an ink cartridge loading unit 104. An operation unit 105 having operation keys and a display are arranged on the upper surface of the ink cartridge loading unit 104. The ink cartridge loading unit 104 has a front cover openable and closable to attach and detach the ink cartridge 201.

Figure 5:
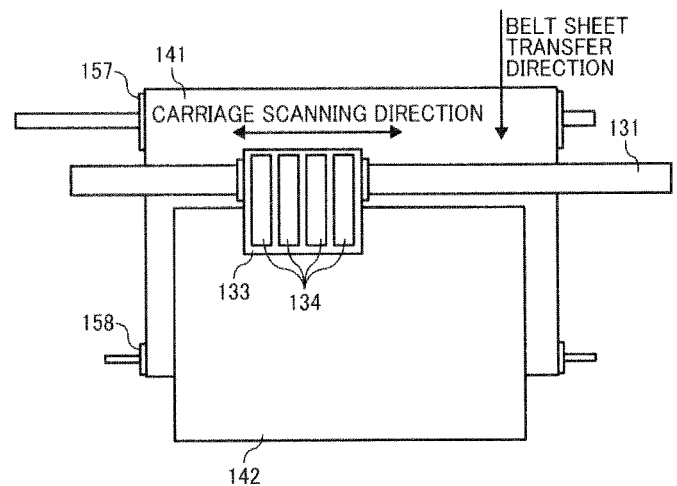
FIG. 5 is a schematic enlarged diagram illustrating an inkjet head.

As illustrated in FIGS. 4 and 5, the main part 101 has a guide rod 131 and a stay 132 serving as the guiding members which are suspended by chassis plates provided on both sides. The guide rod 131 and the stay 132 slidably hold a carriage 133. A main scanning motor moves the carriage 133 in the main scanning direction indicated by the arrows in FIG. 5.

The carriage 133 has a recording head 134 having four inkjet recording heads that discharge ink droplets of yellow (Y), cyan (C), magenta (M), and black (Bk). The recording head 134 is arranged such that multiple ink discharging holes cross the main scanning direction while the ink droplet discharging direction is downward.

Inkjet recording heads forming the recording head 134 which have piezoelectric actuators such as piezoelectric elements, thermal actuators utilizing phase change due to film evaporation using thermoelectric conversion elements such as heat elements, shape-memory-alloy actuators using metal phase change by temperature change, or electrostatic actuators using an electrostatic force as energy generating devices are usable.

In addition, the carriage 133 has sub-tanks 135 for each color to supply each color ink to the recording head 134. The ink for recording is supplied and replenished to the sub-tanks 135 from the ink cartridge 201 mounted to the ink cartridge loading unit 104 via a ink supplying tube.

As a paper feeding section to feed paper 142 placed on a paper loading unit (plate) 141 of the paper feeder tray 102, there are provided a paper feeding roller 143 having half-moon form to separate and feed the paper 142 on the paper loading unit 141 and a separating pad 144 facing the paper feeding roller 143. The separating pad 144 is formed of a material having a large friction factor and biased to the side of the paper feeding roller 143.

Furthermore, as the transfer section to transfer the paper 142 fed from the feeding section below the recording head 134, there are provided a transfer belt 151 to transfer the paper 142 by electrostatic adsorption, a counter roller 152 to transfer the paper 142 sent via a guide 145 from the paper feeding section while sandwiching the paper 142 with the transfer belt 151, a transfer guide 153 to change by substantially 90° the feeding direction of the paper 142 to send up in substantially vertical direction in order for the paper 142 to follow the transfer belt 151, and a front end pressing roller 155 biased to the side of the transfer belt 151 by a pressing member 154.

In addition, a charging roller 156 serving as a charging device is provided to charge the surface of the transfer belt 151.

The transfer belt 151 has an endless belt form and is suspended over a transfer roller 157 and a tension roller 158 and rotatable in the belt transfer direction. This transfer belt 151 has, for example, a surface layer serving as a paper attachment surface having a thickness of about 40 μm with no resistance control formed of a resin material such as a copolymer (ETFE) of tetrafluoroethylene and ethylene and a resistance-controlled rear layer (moderate resistance layer, earth layer) formed of the same material as the surface layer.

On the rear side of the transfer belt 151, a guiding member 161 is arranged corresponding to the printing area of the recording head 134. In addition, as the discharging section to discharge the paper 142 on which an image is already recorded by the recording head 134, there are provided a separating claw 171 to separate the paper 142 from the transfer belt 151, discharging rollers 172 and 173, and a discharging tray 103 under the discharging roller 172.

A duplex paper feeding unit 181 is detachably attachable to the back of the main part 101. The duplex paper feeding unit 181 takes in the paper 142 returned by the reverse rotation of the transfer belt 151 and reverses the paper 142 to feed it between the counter roller 152 and the transfer belt 151 again.

A manual paper feeder 182 is provided on the upper surface of the duplex paper feeding unit 181. In this inkjet recording device, the paper 142 is separated and fed from the paper feeding section. The paper 142 sent up substantially in the perpendicular direction is guided by the guide 145 and transferred between the transfer belt 151 and the counter roller 152.

Furthermore, the front end of the paper 142 is guided by the transfer guide 153 and pressed against the transfer belt 151 by the front end pressing roller 155, thereby changing by substantially 90° the transfer direction. The transfer belt 151 is charged by the charging roller 156 so that the paper 142 is transferred while it is electrostatically-adsorbed by the transfer belt 151.

By driving the recording head 134 according to image signals while moving the carriage 133, ink droplets are discharged to the standstill paper 142 to record a single line of an image and thereafter the paper 142 is transferred in a predetermined amount to print the next line.

After finishing recording the image, when a signal indicating that the rear end of the paper 142 has reached the recording area, the recording operation completes and the paper 142 is discharged to the discharging tray 103. Thereafter, when the remaining amount of the ink for recording in the sub-tanks 135 is detected that it is close to empty, a predetermined amount of the ink for recording is replenished to the sub-tanks 135 from the ink cartridge 201.

In this inkjet recording device, when the ink for recording in the ink cartridge 201 is used up, the chassis in the ink cartridge 201 is disassembled to replace the ink bag 241 inside the chassis.

In addition, the ink cartridge 201 securely supplies the ink for recording even when the ink cartridge 201 is placed upright (on its side) and installed by front loading.

Therefore, when the main part 101 is blocked upside, for example, it is accommodated in a rack or a thing is placed on the upper surface of the main part 101, the ink cartridge 201 is easily exchanged.

Figure 6:
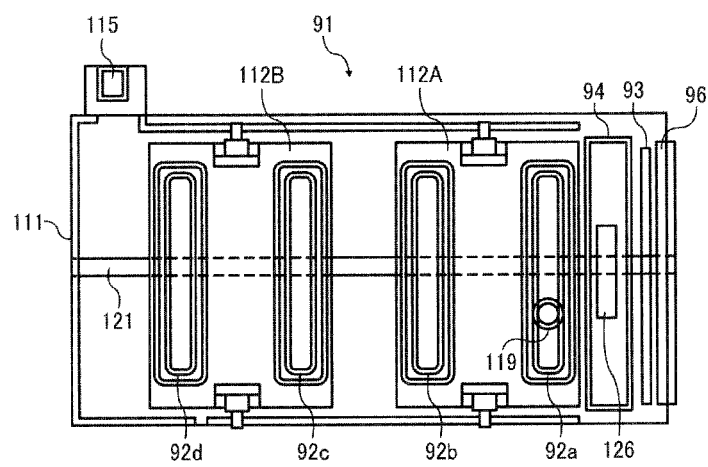
FIG. 6 is a plane view illustrating the main part of a subsystem that contains a maintaining device of an ink discharging device.
Figure 7:
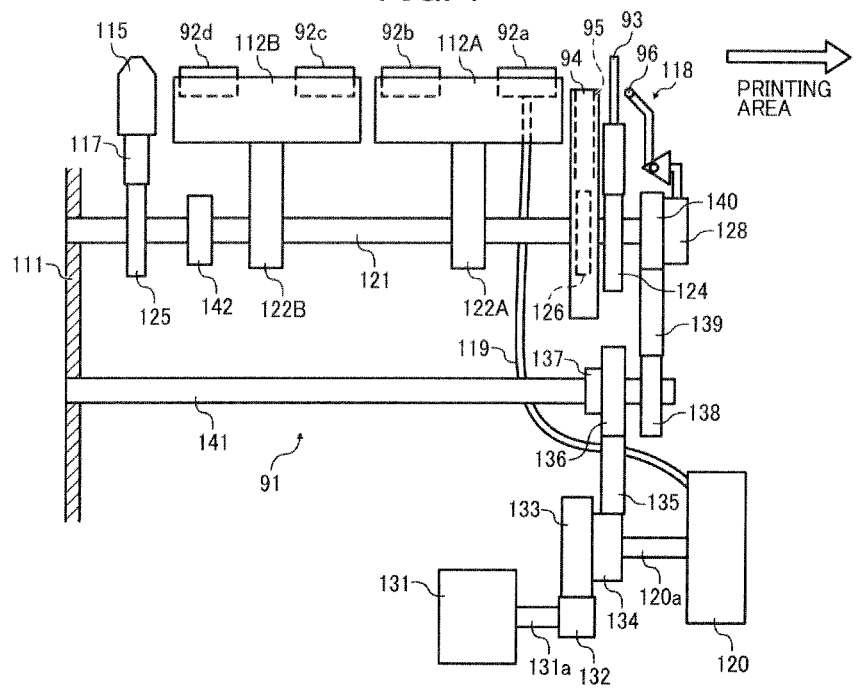
FIG. 7 is a schematic diagram illustrating the structure of the system of FIG. 6.
Figure 8:
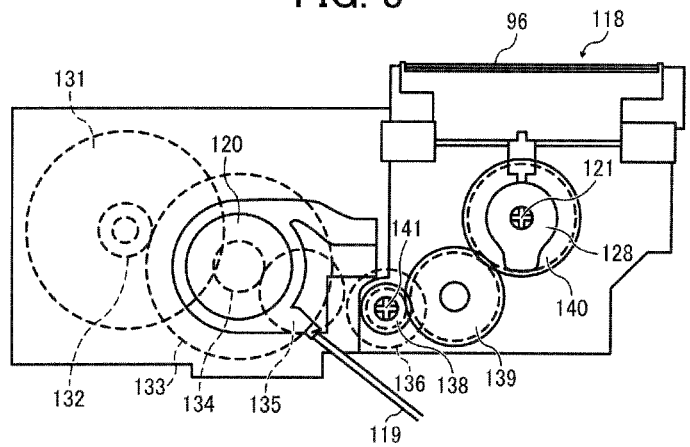
FIG. 8 is a diagram illustrating the right-hand part of the system of FIG. 6.

An example of a sub-system 91 that includes a maintenance device of the ink discharging device is described with reference to FIGS. 6 to 8. FIG. 6 is a plain view illustrating the sub-system 91, FIG. 7 is a schematic diagram illustrating the structure of the sub-system 91, and FIG. 8 is a right-hand side view of the sub-system 91 illustrated in FIG. 6.

In a frame (maintenance frame) 111 of the sub-system 91, there are provided two cap holders 112A and 112B serving as a cap maintenance mechanism, a wiper blade 93 serving as a wiping member including an elastic body as a cleaning device, and a carriage lock 115. The wiper blade 93 and the carriage lock 115 are held in such a manner to be movable upward and downward.

In addition, a dummy ink discharging receiver 94 is provided between the wiper blade 93 and the cap holder 112A. To clean the wiper blade 93, a wiper cleaner 118 is swingably supported which serves as a cleaning device that includes a cleaner roller 96 serving as a cleaning member to press the wiper blade 93 from outside the frame 111 to the side of a wiper cleaner 95 serving as a cleaning member for the dummy ink discharging receiver 94.

The cap holders 112A and 112B (referred to as a cap holder 112 when no separation between both is necessary) have two caps 92a and 92b and 92c and 92d, respectively to cap the nozzle surfaces of the two recording heads.

A tubing pump (suction pump) 120 serving as a suction device is connected to the cap 92a held by the cap holder 112A situated closest to the printing area among the four via a flexible tube 119 and not connected to the other caps 92b, 92c, and 92d. That is, only the cap 92a is set as a suction (restoring) and moisturizing cap (hereinafter referred to as a suction cap) and the other caps are simply set as moisturizing caps.

Therefore, when restoring the recording head, a recording head that needs restoration is selectively moved to a position where the cap 92a can cap the recording head.

In addition, a cam shaft 121 rotatably supported by the frame 111 is arranged below the cap holders 112A and 112B. To the cam shaft 121, there are provided cap cams 122A and 122B to move up and down the cap holders 112A and 112B, a wiper cam 124 to move up and down the wiper blade 93, a carriage lock cam 125 to move up and down the carriage lock 115 via a carriage lock arm 117, a roller 126 serving as a rotatable body of dummy ink droplet landing member on which dummy ink droplets discharged in the dummy ink discharging receiver 94 land, and a cleaner cam 128 to swing the wiper cleaner 118.

The cap 92 is moved up and down by the cap cams 122A and 122B.

The wiper blade 93 is moved up and down by the wiper cam 124. When the wiper blade 93 is moving down, the wiper cleaner 118 advances. Therefore, the wiper blade 93 moves down while it is sandwiched by the cleaner roller 96 of the wiper cleaner 118 and the wiper cleaner 95 of the dummy ink discharging receiver 94 so that the Ink attached to the wiper blade 93 is scraped down into the dummy ink discharging receiver 94.

The carriage lock 115 is biased upward (to the direction of lock) by a compressed spring and moved up and down via the carriage lock arm 117 driven by the carriage lock cam 125. To rotate the tubing pump 120 and the cam shaft 121, with regard to the rotation of a motor 131, a motor gear 132 provided to a motor shaft 131a is engaged with a pump gear 133 provided to a pump shaft 120a of the tubing pump 120, an intermediate gear 136 having a one-way clutch 137 is engaged with an intermediate gear 134 integrated with the pump gear 133 via an intermediate gear 135, and an intermediate gear 138 coaxial with the intermediate gear 136 is engaged with a cam gear 140 fixed to the cam shaft 121 via an intermediate gear 139.

An intermediate shaft of the intermediate gear 136 having the one-way clutch 137 and the intermediate gear 138 are rotatably held by the frame 111.

In addition, a cam 142 for home position sensor to detect the home position of the cam shaft 121 is provided thereto. When the cap 92 has reached the lowest position, a home position lever is shifted to open the sensor by the home position sensor provided to the sub-system 91 so that the home position of the motor 131 (other than the pump 120) can be detected.

When the power is turned on, irrespective of the position of the cap 92 (the cap holder 112), the cap 92 (the cap holder 112) moves up and down and does not conduct the position detection until it starts moving. After the home position (in the middle of moving upward) of the cap 92 is detected, the cap 92 (the cap holder 112) moves down in a predetermined amount to the bottom position.

Thereafter, after the carriage moves left and right for the position detection, it returns to the cap position to cap the recording head 134.

Figure 9:
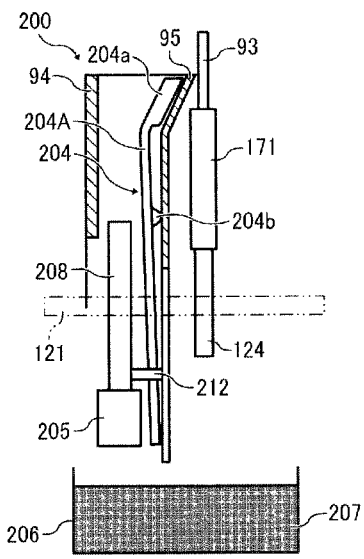
FIG. 9 is a front cross section illustrating a dummy discharging receiving unit in the recording device.
Figure 10:
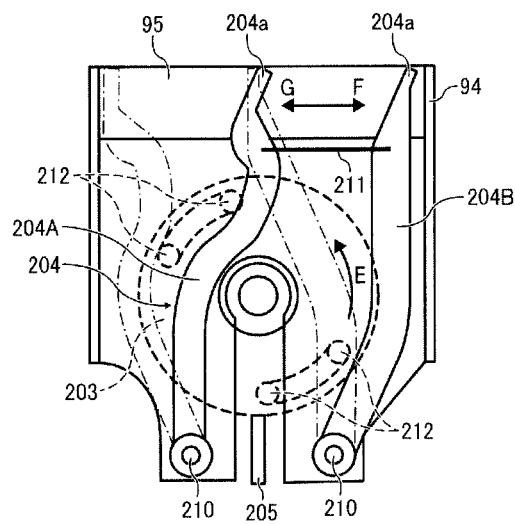
FIG. 10 is a diagram illustrating a latent part of the unit illustrated in FIG. 9.

Next, the dummy discharging receiving unit is described with reference to FIGS. 9 and 10. FIG. 9 is a cross section of a front view illustrating the dummy discharging receiving unit and FIG. 10 is a side view illustrating it.

A dummy discharging receiving unit 200 includes the dummy ink discharging receiver 94, a roller 203 placed under the dummy ink discharging receiver 94 and serving as a dummy discharged ink landing member provided to the cam shaft 121, scraping members 204A and 204B forming a scraping mechanism 204 to scrape recording ink attached to the inside of the wiper cleaner 95, and a scraping member 205 to scrape the recording ink attached to the roller 203 serving as a rotatable body. A waste ink tank 206 that contains an absorber 207 is arranged under the dummy ink discharging receiver 94.

The scraping mechanism 204 to scrape the recording ink attached to the inside of the wiper cleaner 95 of the dummy ink discharging receiver 94 swingably supports the bottom portions of the scraping members 204A and 204B by a branch shaft 210 provided to a holder 201. These scraping members 204A and 204B are linked with each other by a linking member 211 with allowance.

Furthermore, pin members 212 that can contact the scraping members 204A and 204B by the rotation of the roller 203 are provided on the side of the roller 203 serving as a rotatable body of the dummy ink droplet landing member provided to the cam shaft 121. The scraping members 204A and 204B tilt the front ends 204a thereof to follow the slant surface of the wiper cleaner 95.

In addition, a convex portion 204b is provided on the side facing the inside wall of the dummy ink discharging receiver 94 of the scraping members 204A and 204B to reduce the contact area when swinging.

As structured as described above, recording ink removed from the wiper blade 93 attaches to the wiper cleaner 95 when cleaning the wiper blade 93.

When the roller 203 rotates in the direction indicated by the arrow E in FIG. 10 by rotating the cam shaft 121, the pin member 212 of the roller 203 contacts the scraping members 204A and 204B. Therefore, the scraping members 204A and 204B move back and forth (between the positions indicated by the solid lines and the position indicated by the broken lines) along the direction indicated by the arrows F and G in FIG. 10.

By this reciprocating movement of the scraping members 204A and 204B, the recording ink attached to the wiper cleaner 95 is scraped and collected to one or several places by the front ends 204a of the scraping members 204A and 204B. Therefore, the recording ink gathers to form blocks and flows down by its own weight along the inside wall of the dummy ink discharging receiver 94 to drop into the waste ink tank 206 placed therebelow.

That is, in the case of a wiper cleaning mechanism in which the recording ink attached to the wiper blade 93 is pressed against the wiper cleaner 95 for removal, the recording ink remains at the front end of the wiper cleaner 95 if the wiper blade 93 is simply moved while being pressed against the wiper blade 95.

In particular, when the recording ink has a high viscosity, the recording ink remains at the front end of the wiper cleaner 95, which tends to makes it difficult to remove the recording ink attached to the wiper blade 93 during cleaning the next time.

Therefore, even If recording ink having a high viscosity is used, since the droplet volume of the recording ink for the surface contacting the wiper cleaner 95 increases by scraping the recording ink attached to the wiper cleaner 95 to one or a few places, the ink easily flows down from the contact surface with the wiper cleaner 95 and therefore the wiper blade 93 can be cleaned in a clean state for the next time, thereby improving the cleaning property of the wiper blade 93.

According to an experiment, when the viscosity of the recording ink at 25° C. is too great, for example, 5 mPa·s, it is confirmed that the recording ink tends to stay on the front end of the cleaner, which tends to degrade the performance of removing the recording ink from the blade for the next time.

When the scraping members 204A and 204B described above are provided, it is confirmed that the recording ink flows down effectively.

In addition, since the scraping members 204A and 204B are driven by the rotation of the roller 203 serving as a rotatable body of a dummy ink droplet landing member provided to the cam shaft 121, the structure of the scraping mechanism 204 is simple.

In addition, since the roller 203 serving as a rotatable body of a dummy ink droplet landing member rotated by the cam shaft 121 is arranged inside the dummy ink discharging receiver 94, the speed of the mist of the discharged dummy ink droplet is reduced or the dummy ink attached to and collected by the roller 203. Therefore, scattering of the recording ink mist is prevented.

Since the scraping member 205 to scrape the recording ink attached to the roller 203 is provided, the recording ink attached to the roller 203 is scraped by the scraping member 205 and drops into the waste ink tank 206 in its own weight.

By arranging the member to scrape the recording ink attached to the roller 203 below the roller 203 and above the waste ink tank, it is possible to deal with the waste ink by removing the recording ink attached to the roller by a simple mechanism at low cost.

A serial type (shuttle type) inkjet recording device in which a carriage scans is used in this example. Also, this can be applied to a line type inkjet recording device having a line type head.

In addition, the inkjet recording device and the inkjet recording method described above are suitably applied to recording systems employing inkjet recording such as printers for inkjet recording, facsimile machines, photocopiers, multi-functional machines (printer/facsimile/photocopier).

Ink Recording Matter

The ink recording matter on which images are recorded by the inkjet recording device and the inkjet recording method has an image formed on a recording medium using the recording ink described above.

In addition, the ink recording matter has an image formed on the recording medium of the inkjet recording medium and ink set of the present disclosure using the recording ink of the set.

The recording medium has a substrate having a coated layer on at least one side thereof. The transfer amount of pure water to the recording medium having the coated layer measured by a liquid dynamic absorption tester at 23° C. and 50% RH is 2 ml/m² to 35 ml/m² during a contact time of 100 ms and 3 ml/m² to 40 ml/m² during a contact time of 400 ms. In addition, as long as the transfer amount of pure water to the recording medium having the coated layer is within the ranges, there is no specific limit to the recording medium so that any of gloss paper, special paper, cloth, film, a transparent sheet, plain paper, etc. can be suitably used. These can be used alone or in combination.

The ink recording matter is a quality image without blurring and stable over time so that the ink recording matter can be suitably used as a material on which texts and images are recorded.

Having generally described (preferred embodiments of) this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

Preparation Example 1

Preparation of Aqueous Solution A of Aqueous Polymer

α-olefin-maleic anhydride represented by the Chemical Structure 2 (T-YP112, Olefin chain (R): number of carbon atoms: 20 to 24 corresponding to the alkyl group having 18 to 22 carbon atoms in R of Chemical Structure II, manufactured by SEIKO PMC CORPORATION) having an acid value of 190 mgKOH/g and a weight average molecular weight of 10,000:10 parts 1 normal LiOH aqueous solution (having an acid value 1.2 times of a copolymer of α-olefin-maleic anhydride represented by the Chemical Structure 1): 17.34 parts Deionized water: 72.66 parts Heat and stir a mixture of the recipe specified above to dissolve α-olefin-maleic anhydride represented by the Chemical Structure 2 followed by filtering a minute amount of insoluble matters with a filter having an average opening of 5 µm to prepare an aqueous solution A of aqueous polymer.

Preparation Example 2

Preparation of Liquid Dispersion of Surface-Treated Black Pigment

Add 90 g of carbon black having a CTAB specific surface area of 150 m²/g and an DBP oil absorption amount of 100 ml/100 g to 3,000 ml of 2.5 normal sodium sulfate solution and conduct reaction of oxidation treatment by stirring at 300 rpm at 60° C. for ten hours.

Filter the reaction liquid and neutralize the filtered carbon black by sodium hydroxide followed by ultra-filtration.

Wash the thus-obtained carbon black with water. Dry the carbon black and disperse it in pure water such that the solid portion of the carbon black is 30% by weight followed by sufficient stirring to obtain q liquid dispersion of black pigment.

The average particle diameter (D50) of the pigment dispersion in the liquid dispersion of black pigment is 103 nm. The average particle diameter (D50) is measured by particle size distribution measuring instrument (Nanotrac UPA-EX-150, manufactured by Nikkiso Co., Ltd.)

Preparation Example 3

Preparation of Magenta Pigment Containing Polymer Particulate Liquid Dispersant

Preparation of Polymer Solution A

After sufficient replacement with nitrogen gas in a flask equipped with a mechanical stirrer, a thermometer, a nitrogen gas introducing tube, a reflux tube, and a dripping funnel, mix 11.2 g of styrene, 2.8 g of acrylic acid, 12.0 g of lauryl methacrylate, 4.0 g of polyethlene glycol methacrylate, 4.0 g of styrene macromer, and 0.4 g of mercapto ethanol in the flask and heat the system to 65° C., Drip a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone in the flask in two and a half hours;

Subsequently, drip a liquid mixture of 0.8 g of azobis dimethyl valeronitrile and 18 g of methylethyl ketone to the flask in half an hour; After one-hour aging at 65° C., add 0.8 g of azobisdimethyl valeronitrile followed by further one-hour aging;

After the reaction is complete, add 364 g of methylethyl ketone to the flask to obtain 800 g of polymer solution A having a concentration of 50% by weight.

Preparation of Magenta Pigment Containing Polymer Particulate Liquid Dispersion

Sufficiently stir 28 g of the polymer solution A, 4.2 g of C.I. Pigment Red 122, 13.6 g of 1 mol/l potassium hydroxide solution, 20 g of methylethyl ketone, and 13.6 g of deionized water; Mix and knead the mixture using a roll mill;

Place the obtained paste in 200 g of pure water followed by sufficient stirring. Distill away methylethyl ketone using an evaporator and remove coarse particles by filtrating the thus-obtained liquid dispersion with a polyvinylidene fluoride membrane filter having an average hole diameter of 5.0 µm under pressure to obtain a liquid dispersion of polymer particulates containing magenta pigment that contains the pigment in an amount of 15% by weight and a solid portion of 20% by weight.

The average particle diameter (D50) of the polymer particulates in the liquid dispersion of polymer particulates containing magenta pigment is 127 nm. The average particle diameter (D50) is measured by particle size distribution measuring instrument (Nanotrac UPA-EX-150, manufactured by Nikkiso Co., Ltd.)

Preparation Example 4

Preparation of Cyan Pigment Containing Polymer Particulate Liquid Dispersion

A liquid dispersion of polymer particulates containing cyan pigment is prepared in the same manner as in Preparation Example 3 except that C.I. Pigment Red 122 is replaced with phthalocyanine pigment (C.I. Pigment Blue 15:3).

The average particle diameter (D50) of the polymer particulates in the liquid dispersion of polymer particulates containing cyan pigment is 93 nm. The average particle diameter (D50) is measured by particle size distribution measuring instrument (Nanotrac UPA-EX-150, manufactured by Nikkiso Co., Ltd.)

Preparation Example 5

Preparation of Yellow Pigment Containing Polymer Particulate Liquid Dispersion

A liquid dispersion of polymer particulates containing yellow pigment is prepared in the same manner as in Preparation Example 3 except that C.I. Pigment Red 122 is replaced with monoazo yellow pigment (C.I. Pigment Yellow 74).

The average particle diameter (D50) of the polymer particulates in the liquid dispersion of polymer particulates containing yellow pigment is 76 nm. The average particle diameter (D50) is measured by particle size distribution measuring instrument (Nanotrac UPA-EX-150, manufactured by Nikkiso Co., Ltd.)

Preparation Example 6

Preparation of Carbon Black Pigment Containing Polymer Particulate Liquid Dispersion A liquid dispersion of polymer particulates containing carbon black pigment is prepared in the same manner as in Preparation Example 3 except that C.I. Pigment Red 122 is replaced with carbon black (FW100, manufactured by Degussa AG).

The average particle diameter (D50) of the polymer particulates in the liquid dispersion of polymer particulates containing carbon black pigment is 104 nm. The average particle diameter (D50) is measured by particle size distribution measuring instrument (Nanotrac UPA-EX-150, manufactured by Nikkiso Co., Ltd.)

Preparation Example 7

Preparation of Liquid Dispersion of Yellow Pigment Surface Active Agent

| | |
|---|---|
| Monoazo yellow pigment (C.I. Pigment Yellow 74, manufactured by Dainichiseika Color and Chemicals Mfg. Co., Ltd.): | 30 parts |
| Polyoxyethylene styrene phenylether (nonionic surface active agent, NOIGEN EA177, HLB value: 15.7, manufactured by DAI-ICHI KOGYO SEIYAKU CO., LTD.) | 10 parts |
| Deionized water | 60.0 parts |

Dissolve the surface active agent specified above in the deionized water followed by mixing with the pigment specified above. Subsequent to sufficient moistening, disperse the resultant with a wet type dispersing device (DYNO-MILL KDL A type, manufactured by Willy A. Bachofen AG) in which zirconia beads having a diameter of 0.5 mm are filled with at 2,000 rpm for two hours to obtain a primary pigment dispersion.

Then, add 4.26 parts of hydrosoluble polyurethane resin (Takelac W-5661, manufactured by Mitsui Chemicals, Inc., effective component: 35.2% by weight, acid value: 40 mgKOH/g, molecular weight: 18,000) followed by sufficient stirring to obtain a liquid dispersion of yellow pigment surface active agent.

The average particle diameter (D50) of the pigment dispersion in the liquid dispersion of yellow pigment is 62 nm. The average particle diameter (D50) is measured by particle size distribution measuring instrument (Nanotrac UPA-EX-150, manufactured by Nikkiso Co., Ltd.)

Examples 1 and 7 and Comparative Examples 1 and 2

Manufacturing of Ink for Recording

Each ink for recording is manufactured in the following procedure.

Mix a hydrosoluble organic solvent (moisturizing agent), a permeating agent, a surface active agent, and a mildew-proofing agent shown in Table 1 and water followed by a one-hour stirring for uniform mixing. Add a hydrosoluble resin to the liquid mixture followed by one hour stirring. Add a pigment liquid dispersion and a defoaming agent thereto followed by one hour stirring.

Filter the thus-obtained liquid dispersion with a polyvinilydene fluoride membrane filter having an average hole diameter of 5.0 μm under pressure to remove coarse particles and dust. Thus, each ink for recording of Examples 1 to 7 and Comparative Examples 1 and 2.

TABLE 1

| | | Example 1 | Example 2 | Example 3 | Example 4 | Example 5 |
|---|---|---|---|---|---|---|
| Water | Deionized water | 1.27 | 20.96 | 35.07 | 1.27 | 2.02 |
| Hydrosoluble organic solvent | Amide compound (Chemical Structure 1) | 10 | 5 | 15 | 10 | 10 |
| | 1,3-butane diol | | | | 12.5 | 20 |
| | 3-methyl-1,3-butane diol | 20 | 15 | | 20 | |
| | Glycerin | 10 | 15 | 15 | 10 | 10 |
| | 1,2,4-butan triol | | 2 | | | |

TABLE 1-continued

| | | 1 | 2 | 3 | 4 | 5 |
|---|---|---|---|---|---|---|
| Hydrodispersible resin | Acrylic silicone resin emulsion | | | 5.38 | | |
| | Polyurethane emulsion | | 8.89 | | | |
| Permeating agent | 2-ethyl-1,3-hexane diol | | | 2 | | 2 |
| | 2,2,4-trimethyl-1,3-pentane diol | 2 | 2 | | 2 | |
| Pigment liquid dispersion | Black pigment containing polymer particulate liquid dispersion (Preparation Example 6) | 55.33 | | | 55.33 | |
| | Magenta pigment containing polymer particulate liquid dispersion (Preparation Example 3) | | | | | 53.33 |
| | Cyan pigment containing polymer particulate liquid dispersion (Preparation Example 4) | | | | | |
| | Yellow pigment containing polymer particulate liquid dispersion (Preparation Example 5) | | | | | |
| | Liquid dispersion of surface-treated black pigment (Preparation Example 2) | | 30 | | | |
| | Liquid dispersion of yellow pigment surface active agent (Preparation Example 7) | | | 13.9 | | |
| Surface active agent | Fluorine containing surface active agent (Zonyl FS-300 *3) | 1.25 | | | 1.25 | 2.5 |
| | KF643 *4 | | 1 | 1 | | |
| Antifungal Agents | Prpxel GXL *5 | 0.05 | 0.05 | 0.05 | 0.05 | 0.05 |
| Defoaming agent | Silicone defoaming agent KM-72F *6 | 0.1 | 0.1 | 0.1 | 0.1 | 0.1 |
| | Total of ink (black) | 100 | 100 | 100 | 100 | 100 |

TABLE 1-continued

| | | | | | |
|---|---|---|---|---|---|
| Recording medium | Gloss paper 1 *[7] | Gloss paper 1 *[7] | Gloss paper 1 *[7] | Gloss paper 2 *[8] | Gloss paper 1 *[7] |
| Image density | 2.4 | 1.78 | 1.51 | 2.28 | 1.88 |
| Smearing fixing property | 4 | 4 | 4 | 4 | 4 |
| Spur mark | E | G | G | E | E |
| Beading | E | G | G | G | G |
| Gloss (image portion) | 30 | 23 | 21 | 26 | 38 |
| Cockling | G | G | G | G | G |

| | | Example 6 | Example 7 | Comparative Example 1 | Comparative Example 2 |
|---|---|---|---|---|---|
| Water | Deionized water | 8.27 | 13.27 | 1.27 | 1.27 |
| Hydrosoluble organic solvent | Amide compound (Chemical Structure 1) | 50 | 20 | | 10 |
| | 1,3-butane diol | | 20 | | |
| | 3-methyl-1,3-butane diol | | 10 | 20 | 20 |
| | Glycerin | 5 | | 20 | 10 |
| | 1,2,4-butan triol | | | | |
| Hydrodispersible resin | Acrylic silicone resin emulsion | | | | |
| | Polyurethane emulsion | | | | |
| Permeating agent | 2-ethyl-1,3-hexane diol | 2 | 2 | | |
| | 2,2,4-trimethyl-1,3-pentane diol | | | 2 | 2 |
| Pigment liquid dispersion | Black pigment containing polymer particulate liquid dispersion (Preparation Example 6) | | | 55.33 | 55.33 |
| | Magenta pigment containing polymer particulate liquid dispersion (Preparation Example 3) | | | | |
| | Cyan pigment containing polymer particulate liquid dispersion (Preparation Example 4) | 33.33 | | | |
| | Yellow pigment containing polymer particulate liquid dispersion (Preparation Example 5) | | 33.33 | | |
| | Liquid dispersion of surface-treated | | | | |

TABLE 1-continued

| | | | | | |
|---|---|---|---|---|---|
| | Black pigment (Preparation Example 2) Liquid dispersion of yellow pigment surface active agent (Preparation Example 7) | | | | |
| Surface active agent | Fluorine containing surface active agent (Zonyl FS-300 *3) KF643 *4 | 1.25 | 1.25 | 1.25 | 1.25 |
| Antifungal Agents | Prpxel GXL *5 | 0.05 | 0.05 | 0.05 | 0.05 |
| Defoaming agent | Silicone defoaming agent KM-72F *6 | 0.1 | 0.1 | 0.1 | 0.1 |
| | Total of ink (black) | 100 | 100 | 100 | 100 |
| Recording medium | | Gloss paper 1 *7 | Gloss paper 1 *7 | Gloss paper 1 *7 | Plain paper *9 |
| Image density | | 2.01 | 1.53 | 2.31 | 1.18 |
| Smearing fixing property | | 4 | 4 | 2 | 4 |
| Spur mark | | E | E | B | E |
| Beading | | G | E | B | G |
| Gloss (image portion) | | 28 | 42 | 27 | 2 |
| Cockling | | G | G | B | G |

Product names, etc. shown in Table 1 represent as follows:
*1 Emulsion of acrylic resin and silicone resin: (Polyzole ROY6312, Solid Portion: 37.2% by weight, average particle diameter: 171 nm, Minimum Film forming Temperature (MFT): 20° C., manufactured by SHOWA HIGHPOLYMER CO., LTD.)
*2 Polyurethane Emulsion: (HYDRAN APX-101H, Solid Portion: 45% by weight, average particle diameter: 160 nm, Minimum Film forming Temperature (MFT): 20° C., manufactured by DIC Corporation)
*3 Zonyl FS-300: Polyoxyethylene perfluoroalkyl ether (component: 40% by weight, manufactured by Du Pont Kabushiki Kaisha)
*4 KF-643: Polyether modified silicone compound (component: 100% by weight, manufactured by Shin-Etsu Chemical Co., Ltd.)
*5 Proxel GXL: a mildew-proofing agent containing 1,2-benzisothiazolin-3-one as the main component (component: 20% by weight, dipropylene glycol contained, manufactured by Avecia Inkjet Limited)
*6 KM-72F: Self-emulsion type silicone defoaming agent (component: 100% by weight, manufactured by Shin-Etsu Silicone Co., Ltd.)
*7 Gloss paper 1: POD Gloss Coat Paper <100> (Refer to recording paper 2 mentioned below)
*8 Gloss paper 2: Aurora Coat (manufactured by Nippon Paper Industries Co., Ltd.) (Refer to recording paper 1 mentioned below)
*9 Plain paper: My Paper (Refer to recording paper 3 mentioned below)

Recording Medium

The following is used as the recording media.
Recording Paper 1
Product Name: Aurora Coat
Basis weight=104.7 g/m² (manufactured by Nippon Paper Industries Co., Ltd.)
Recording Paper 2
Product Name: POD Gloss Coat Paper <100>
Basis weight=100 g/m² (manufactured by Nippon Paper Industries Co., Ltd.)
Recording Paper 3
Product Name My Paper
Basis weight=67 g/m² (manufactured by Ricoh Co., Ltd.)
Measuring of Transfer Amount of Pure Water by Liquid Dynamic Absorption Tester Measure the transfer amount of pure water to the surface on which the coated layer is applied for the recording paper 1 to 3. A liquid dynamic absorption tester ($K_{350}$ Series D type, manufactured by KYOWA CO., LTD.) is used to measure the transfer amount of pure water.

The results are shown in Table 2.

TABLE 2

| | Pure water | |
|---|---|---|
| | Contact time (100 ms) | Contact time (400 ms) |
| Recording paper 1 | 2.8 | 3.4 |
| Recording paper 2 | 3.1 | 4.5 |
| Recording paper 3 | 30 | 50 |

Evaluate each ink for inkjet recording of Examples 1 to 7 and Comparative Examples 1 and 2 according to the following evaluation criteria. The results are shown in Table 1.

Preparation of Evaluation on Imaging

In an environment in which the temperature and moisture are adjusted to range from 22.5° C. to 23.5° C. and 45% RH to 55% RH, change the driving voltage of piezoelectric element such that the same amount of ink is attached to the recording media by setting an inkjet printer (IPSiO GXe 5500, manufactured by Ricoh Co., Ltd.) to discharge the same amount of ink.

Image Density

Print a chart including a 64 point character ■ drawn by Microsoft Word 2000 on My Paper (manufactured by Ricoh Co., Ltd.) and measure the color of ■ portion of the printed surface by a reflection spectrodensitometer (X-Rite 939, manufactured by X-RITE Co., Ltd.).

The printing mode is: a modified mode in which "Plain Paper—Standard Fast" is modified to "no color calibration" from a user setting for plain paper by a driver attached to the printer.

Smearing Fixing Property

Three hours after the printing is complete, move white cotton cloth (manufactured by TOYO SEIKI Co., Ltd.) attached to a clock meter (manufactured by TOYO SEIKI Co., Ltd.) back and forth on the printed solid image portion ten times and observe the ink attached to the white cotton with naked eyes to evaluate the contamination according to the following criteria:

5: No contamination
4: Slightly contaminated
3: Contaminated but causing no practical problem
2: Slightly substantially contaminated
1: Substantially contaminated Evaluation on Spur Mark Observe the degree of the spur mark on each image print with naked eyes and evaluate by the following criteria:

Evaluation Criteria
E (Excellent): No spur marks
G (Good): Slight spur marks observed
B (Bad): Serious spur marks observed Beading Observe the degree of the beading on the green solid image portion of each image print with naked eyes and evaluate by the following criteria:

Evaluation Criteria
E (Excellent): Uniform printing with no beading
G (Good): Slight beading observed
B (Bad): Clear beading observed Gloss Output a solid image portion prepared by using Microsoft Word 2000 (manufactured by Microsoft Corporation) and measure the 60° gloss thereof by using a gloss meter (Micro-Gross 60°, manufactured by Atlas).

Occurrence of Cockling

To check whether cockling occurs, draw a chart to occupy the entire by a solid image by using Microsoft Word 2000 (manufactured by Microsoft Corporation) and make an evaluation of the degree of curling of the paper after printing according to the following criteria:

Evaluation Criteria
G (Good): No problem caused for the following discharging paper
B (Bad): Both ends curled up, causing a problem for discharging As described above, the inkjet recording medium and ink set of the present disclosure is excellent about the image density and gloss for a recording medium having poor ink absorption property such as gloss coat paper for common-use commercial printing which is available at inexpensive cost and in addition produces quality recording matters without problems such as low fixing property and cockling with regard to inkjet recording matters using the recording medium having poor ink absorption property mentioned above. Moreover, the ink discharging stability for the nozzle is good, thereby producing quality images so that the set is suitably used for ink cartridges, ink recording materials, inkjet recording devices, and inkjet recording methods.

What is claimed is:

1. An inkjet recording medium and ink set, comprising:
ink comprising:
water;
a hydrosoluble organic solvent comprising an amide compound represented by the following Chemical Structure 1;

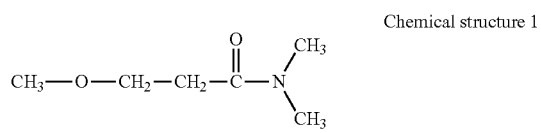

Chemical structure 1 a surface active agent; and
a coloring agent; and
a recording medium comprising:
a substrate; and
a coated layer on at least one side of the substrate,
wherein a transfer amount of pure water to the recording medium having the coated layer is 2 ml/m² to 35 ml/m² during a contact time of 100 ms and 3 ml/m² to 40 ml/m² during a contact time of 400 ms when measured by a liquid dynamic absorption tester at 23° C. and 50% RH, and
wherein the hydrosoluble organic solvent further comprises wetting agents, wherein a content of the hydrosoluble organic solvent comprising the amide compound represented by the Chemical Structure 1, and all of the wetting agents in the hydrosoluble organic solvent, in the ink for inkjet recording, ranges from 20% by weight to 50% by weight, and
wherein the wetting agents in the hydrosoluble organic solvent comprises:
a wetting agent A which is a polyol having an equilibrium moisture content of 30% or more by weight in an environment of 23° C. and relative humidity of 80% and a boiling point of higher than 250° C.; and
a wetting agent B, which is a polyol having an equilibrium moisture content of 30% or more by weight at 23° C. and relative humidity of 80% and a boiling point of from 140° C. to 250° C.

2. The inkjet recording medium and ink set according to claim 1, wherein a content of the amide compound represented by the Chemical Structure 1 in the ink for inkjet recording ranges from 1% by weight to 50% by weight.

3. The inkjet recording medium and ink set according to claim 1, wherein the coloring agent comprises a pigment that has at least one kind of hydrophilic group on the surface thereof and is hydrodispersible in the absence of a dispersing agent.

4. The inkjet recording medium and ink set according to claim 1, wherein the coloring agent comprises a pigment dispersion in which a pigment, a pigment dispersant, and a polymer dispersion stabilizer are dispersed in water.

5. The inkjet recording medium and ink set according to claim 1, wherein the coloring agent comprises a polymer emulsion in which hydro insoluble polymer particulates and/or slightly soluble polymer particulates comprising a pigment are dispersed in water.

6. The inkjet recording medium and ink set according to claim 1, wherein the ink for inkjet recording is at least one ink selected from the group consisting of cyan ink, magenta ink, yellow ink, and black ink.

7. A method of ink jet recording comprising:
discharging ink for inkjet recording onto a recording medium having a coated layer on at least one side thereof,
wherein a transfer amount of pure water to the recording medium is 2 ml/m² to 35 ml/m² during a contact time of 100 ms and 3 ml/m² to 40 ml/m² during a contact time of 400 ms as measured by a liquid dynamic absorption tester at 23° C. and 50% RH,
wherein the ink for inkjet recording comprises water, a hydrosoluble organic solvent comprising an amide compound represented by the following Chemical Structure 1, a surface active agent, and a coloring agent:

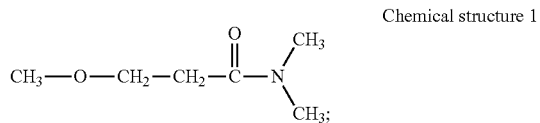

Chemical structure 1 wherein the hydrosoluble organic solvent further comprises wetting agents,
wherein a content of the hydrosoluble organic solvent comprising the amide compound represented by the Chemical Structure 1, and all of the wetting agents in the hydrosoluble organic solvent, in the ink for inkjet recording, ranges from 20% by weight to 50% by weight, and
wherein the wetting agents in the hydrosoluble organic solvent comprises:
a wetting agent A, which is a polyol having an equilibrium moisture content of 30% or more by weight in an environment of 23° C. and relative humidity of 80% and a boiling point of higher than 250° C.; and
a wetting agent B, which is a polyol having an equilibrium moisture content of 30% or more by weight at 23° C. and relative humidity of 80% and a boiling point of from 140° C. to 250° C.

8. An inkjet recording medium and ink set, comprising:
ink comprising:
water,
a hydrosoluble organic solvent comprising an amide compound represented by the following Chemical Structure 1;

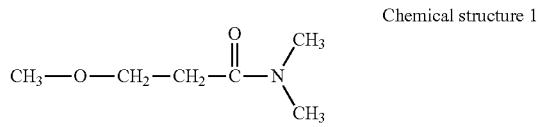

Chemical structure 1 a surface active agent; and
a coloring agent; and
a recording medium comprising:
a substrate; and
a coated layer on at least one side of the substrate,
wherein a transfer amount of pure water to the recording medium having the coated layer is 2 ml/m² to 35 ml/m² during a contact time of 100 ms and 3 ml/m² to 40 ml/m² during a contact time of 400 ms when measured by a liquid dynamic absorption tester at 23° C. and 50% RH,
wherein the hydrosoluble organic solvent further comprises wetting agents,
wherein a content of the hydrosoluble organic solvent comprising the amide compound represented by the Chemical Structure 1, and all of the wetting agents in the hydrosoluble organic solvent, in the ink for inkjet recording, ranges from 20% by weight to 50% by weight, and
wherein the wetting agents in the hydrosoluble organic solvent include:
a first wetting agent selected from the group consisting of 1,2,3-butane triol, 1,2,4-butane triol, glycerine, diglycerine, triethylene glycol, and tetraethylene glycol;
a second wetting agent that has a relatively lower boiling point than the first wetting agent; and
a third wetting agent that has a relatively lower boiling point than the first wetting agent.

9. The inkjet recording medium and ink set according to claim 8, wherein
both of the first wetting agent and the second wetting agent have an equilibrium moisture content of 30% or more by weight in an environment of 23° C. and a relative humidity of 80%,
the third wetting agent has an equilibrium moisture content of less than 30% by weight in an environment of 23° C. and a relative humidity of 80%, and
the second wetting agent has a relatively higher evaporativity than the wetting agent A.

10. The inkjet recording medium and ink set according to claim 9, wherein
the boiling point of the third wetting agent is lower than 240° C.

11. The inkjet recording medium and ink set according to claim 1, wherein the wetting agents further comprise a wetting agent C, which is a polyol having an equilibrium moisture content of less than 30% by weight in an environment of 23° C. and relative humidity of 80%.

12. The inkjet recording medium and ink set according to claim 1, wherein the wetting agent comprises at least one of 1,2,3-butane triol, 1,2,4-butane triol, glycerine, diglycerine, triethylene glycol, or tetraethylene glycol.

13. The method according to claim 7, wherein the wetting agents further comprise a wetting agent C, which is a polyol having an equilibrium moisture content of less than 30% by weight in an environment of 23° C. and relative humidity of 80%.

14. The method according to claim 7, wherein the wetting agent comprises at least one of 1,2,3-butane triol, 1,2,4-butane triol, glycerine, diglycerine, triethylene glycol, or tetraethylene glycol.

15. The method according to claim 7, wherein a content of the amide compound represented by the Chemical Structure 1 in the ink for inkjet recording ranges from 1% by weight to 50% by weight.

16. The method according to claim 7, wherein the coloring agent comprises a pigment that has at least one kind of hydrophilic group on the surface thereof and is hydrodispersible in the absence of a dispersing agent.

17. The method according to claim 7, wherein the coloring agent comprises a pigment dispersion in which a pigment, a pigment dispersant, and a polymer dispersion stabilizer are dispersed in water.

18. The method according to claim 7, wherein the coloring agent comprises a polymer emulsion in which hydro insoluble polymer particulates and/or slightly soluble polymer particulates comprising a pigment are dispersed in water.

19. The method according to claim 7, wherein the ink for inkjet recording is at least one ink selected from the group consisting of cyan ink, magenta ink, yellow ink, and black ink.

* * * * *